US012410005B2

(12) United States Patent
Johnson et al.

(10) Patent No.: US 12,410,005 B2
(45) Date of Patent: Sep. 9, 2025

(54) CASSETTE FOR DISPENSING PLEATED TUBING

(71) Applicant: MUNCHKIN, INC., Van Nuys, CA (US)

(72) Inventors: Kevin Douglas Johnson, Tarzana, CA (US); Steven Bryan Dunn, Beverly Hills, CA (US)

(73) Assignee: MUNCHKIN, INC., Van Nuys, CA (US)

( * ) Notice: Subject to any disclaimer, the term of this patent is extended or adjusted under 35 U.S.C. 154(b) by 0 days.

(21) Appl. No.: 18/367,436

(22) Filed: Sep. 12, 2023

(65) Prior Publication Data

US 2024/0002145 A1 Jan. 4, 2024

Related U.S. Application Data

(63) Continuation-in-part of application No. 29/893,055, filed on May 24, 2023, and a continuation-in-part of application No. 17/889,367, filed on Aug. 16, 2022, now Pat. No. 11,753,239, which is a continuation of application No. 17/066,349, filed on Oct. 8, 2020, now Pat. No. 11,414,266, which is a continuation-in-part of application No. 16/542,015, filed on Aug. 15, 2019, now Pat. No. 11,130,628, which is a continuation of application No. 16/041,689, filed on Jul. 20, 2018, now Pat. No. 10,435,235, which is a continuation of application No. 14/939,588, filed on Nov. 12, 2015, now Pat. No. 10,053,282, which is a continuation-in-part of application No. 14/736,192, filed on Jun. 10, 2015, now Pat. No. 10,486,925, which is a continuation of application No. 13/688,139, filed on Nov. 28, 2012, now Pat. No. 9,085,404, which is a continuation of (Continued)

(51) Int. Cl.
*B65F 1/00* (2006.01)
*B65F 1/06* (2006.01)

(52) U.S. Cl.
CPC ............ *B65F 1/0006* (2013.01); *B65F 1/062* (2013.01); *B65F 2210/1675* (2013.01); *B65F 2240/132* (2013.01)

(58) Field of Classification Search
CPC .................... B65F 1/0006; B65F 1/062; B65F 2210/1675; B65F 2240/132
USPC ...................................... 206/409; 220/495.07
See application file for complete search history.

(56) References Cited

U.S. PATENT DOCUMENTS 7,743,588 B2 * 6/2010 Webb ...................... B65F 1/062 53/577
10,696,476 B2 * 6/2020 Morand ................ B65F 1/0006

(Continued)

*Primary Examiner* — Steven A. Reynolds
(74) *Attorney, Agent, or Firm* — ArentFox Schiff LLP

(57) ABSTRACT

A cassette to dispense a pleated tubing. The cassette includes a circular body having an annular channel housing and a pull tab and pull strip. At least one wall has an upper end with a lip disposed thereon. An annular cover is attached to the lip at the upper end defining a gap over the annular body. A tubing is disposed within the annular channel housing and withdrawn from the gap. At least one of a plurality of apertures is provided at a lower end of the annular channel housing. The apertures are adapted to be aligned with a projection extending upward from within a container.

20 Claims, 37 Drawing Sheets

Related U.S. Application Data application No. 29/435,445, filed on Oct. 24, 2012, now Pat. No. Des. 695,541.

(60) Provisional application No. 62/912,567, filed on Oct. 8, 2019, provisional application No. 62/078,915, filed on Nov. 12, 2014.

(56) References Cited

U.S. PATENT DOCUMENTS

| | | | | |
|---|---|---|---|---|
| 2002/0162304 | A1* | 11/2002 | Stravitz | B65F 1/12 53/526 |
| 2008/0272140 | A1* | 11/2008 | Mowers | B65F 1/062 221/69 |
| 2017/0233182 | A1* | 8/2017 | Chakravarthy | B65F 1/163 220/495.06 |

* cited by examiner

CASSETTE FOR DISPENSING PLEATED TUBING

CROSS REFERENCE TO RELATED APPLICATIONS

This application is a continuation-in-part of U.S. Design patent application Ser. No. 29/893,055, filed May 24, 2023; this application is also a continuation-in-part of U.S. patent application Ser. No. 17/889,367, filed Aug. 16, 2022; which is a continuation of U.S. patent application Ser. No. 17/066,349, filed Oct. 8, 2020, now U.S. Pat. No. 11,414,266; which claims priority to U.S. Provisional Patent Application Ser. No. 62/912,567, filed Oct. 8, 2019; and is a continuation-in-part of U.S. patent application Ser. No. 16/542,015, filed Aug. 15, 2019, now U.S. Pat. No. 11,130,628; which is a continuation of U.S. patent application Ser. No. 16/041,689, filed Jul. 20, 2018, now U.S. Pat. No. 10,435,235; which is a continuation of U.S. patent application Ser. No. 14/939,588, filed Nov. 12, 2015, now U.S. Pat. No. 10,053,282; which claims priority to U.S. Provisional Patent Application Ser. No. 62/078,915, filed Nov. 12, 2014; and is a continuation-in-part of U.S. patent application Ser. No. 14/736,192, filed Jun. 10, 2015, now U.S. Pat. No. 10,486,925; which is a continuation of U.S. patent application Ser. No. 13/688,139, filed Nov. 28, 2012, now U.S. Pat. No. 9,085,404; which is a continuation of U.S. Design patent application Ser. No. 29/435,445, filed Oct. 24, 2012, now U.S. Pat. No. D695,541; the content of all of which are hereby incorporated by reference herein in their entirety into this disclosure.

TECHNICAL FIELD

The subject disclosure relates to a cassette used for dispensing pleated tubing. More specifically, to a cassette capable of storing a pleated tubing and adapted for use within a disposal container to collect waste refuse.

BACKGROUND

Various refillable cassettes have been provided for the disposal of waste material. Conventional dispensers typically require cumbersome techniques overcome by the disclosure below. Despite the ineffectiveness of these conventional attempts to provide a storage cassette, a need exists for a low cost, efficient storage container that can be conveniently assembled.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Figure 1:
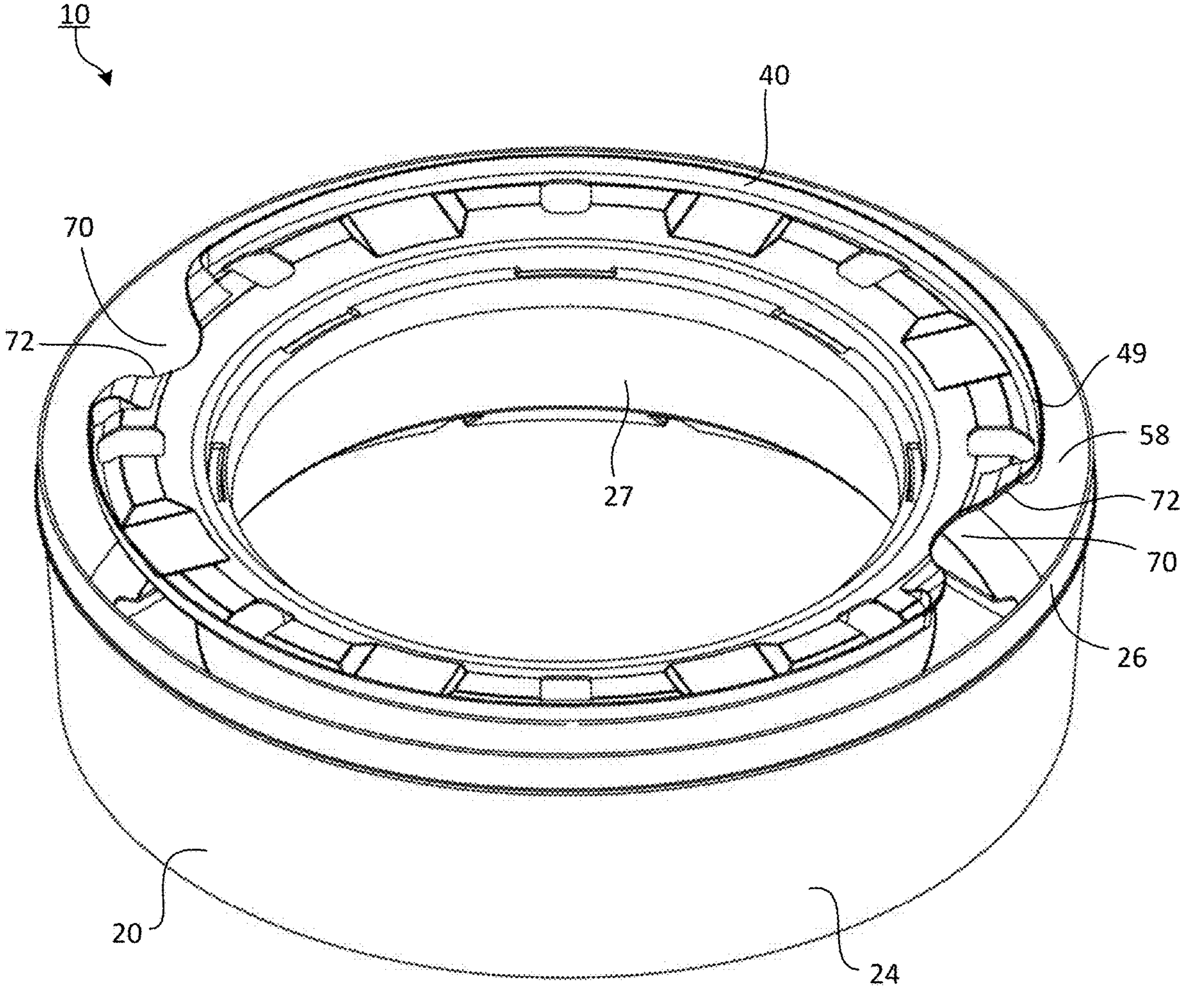
FIG. 1 illustrates an upper perspective view of an exemplary cassette according to the subject disclosure.

Particular embodiments of the present invention will now be described in greater detail with reference to the figures.

FIGS. 1-4 illustrate upper and lower perspective and exploded perspective views of an exemplary cassette 10 according to this subject disclosure.

FIGS. 1-4 show the cassette 10 is comprised of a lower annular body 20 having a generally U-shaped cross-section compartment and an annular cover 40 that extends over a portion of the U-shaped channel cross-section compartment. An opening 58 is provided between an outer concentric edge 49 of the annular cover 40 and an upper end 26 of an outer wall 24 of the lower annular body 20. The annular cover 40 is attached to the lower annular body 20 at a central cylindrical core 27, as will be discussed in greater detail below.

Figure 2:
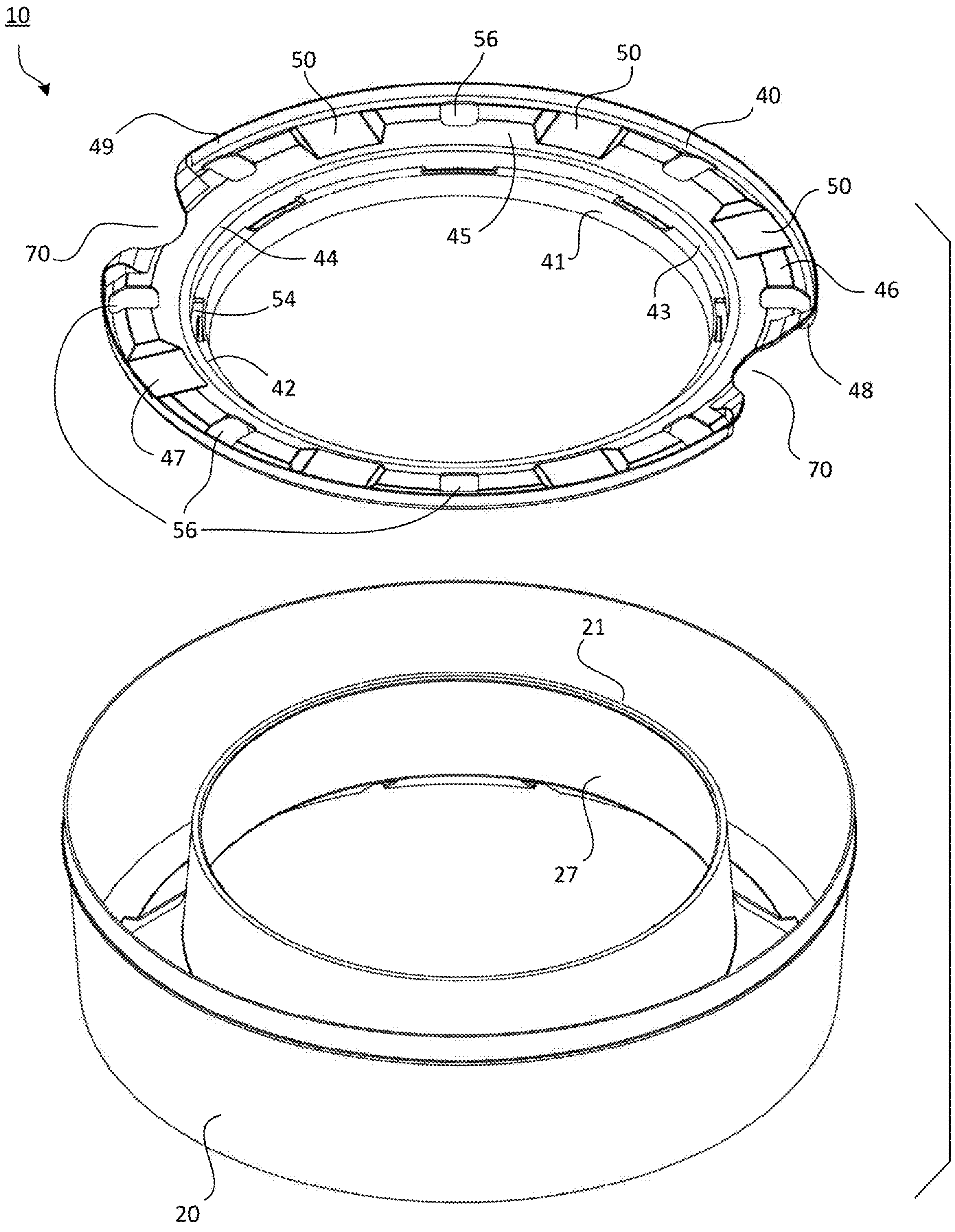
FIG. 2 depicts an exploded upper perspective view of an annular cover and annular body of the cassette according to the subject disclosure.
Figure 13:
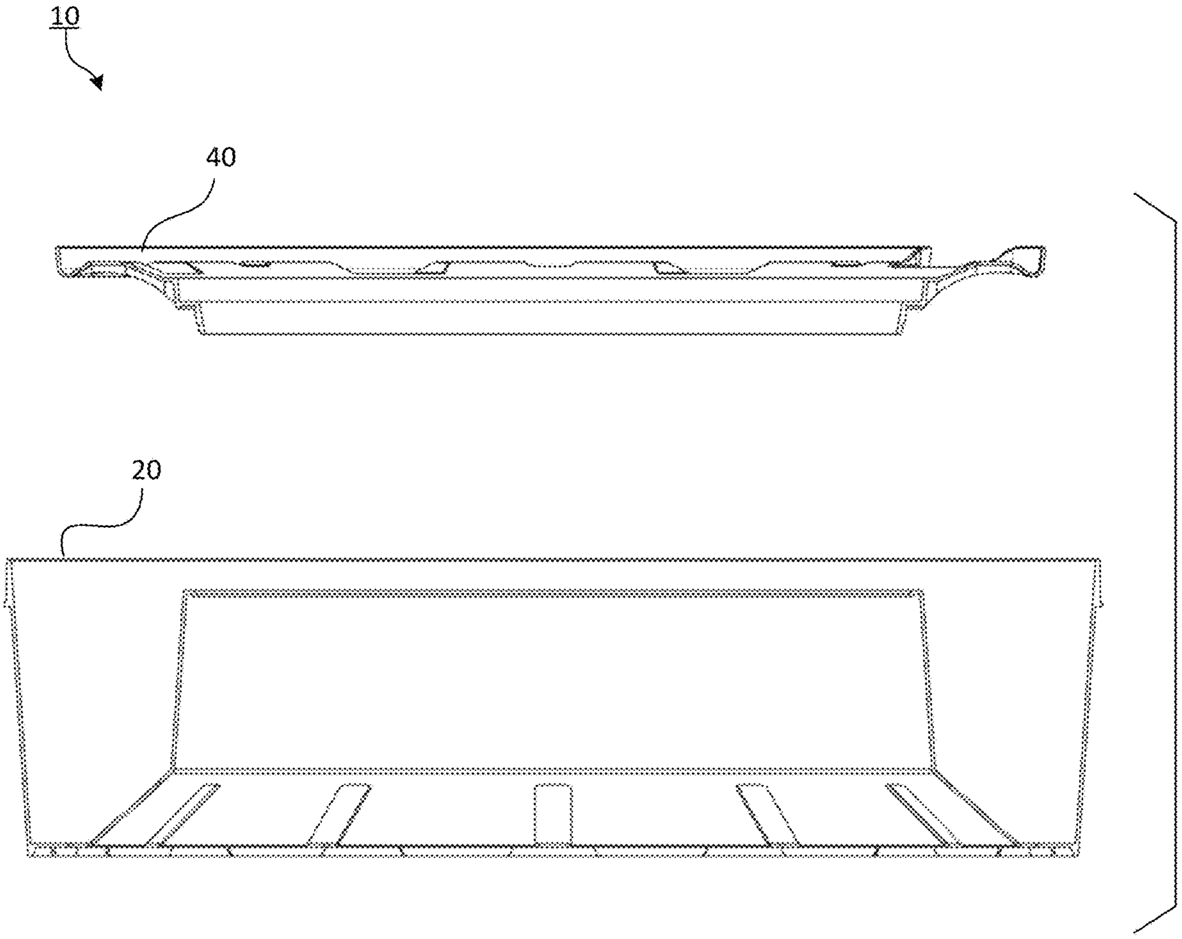
FIG. 13 shows an exploded cross section side view of the annular cover and annular body of the cassette.

FIGS. 2 and 13 illustrate an upper view of the cassette 10 having the annular cover 40. The annular cover 40 generally has an inner cylindrical wall 41 and upper horizontal wall 46. The annular cover 40 may have at least one recessed plateau 50 and at least one through hole 56 disposed in the upper horizontal wall 46. The annular cover 40 may also have at least one engagement groove 70.

Figure 11:
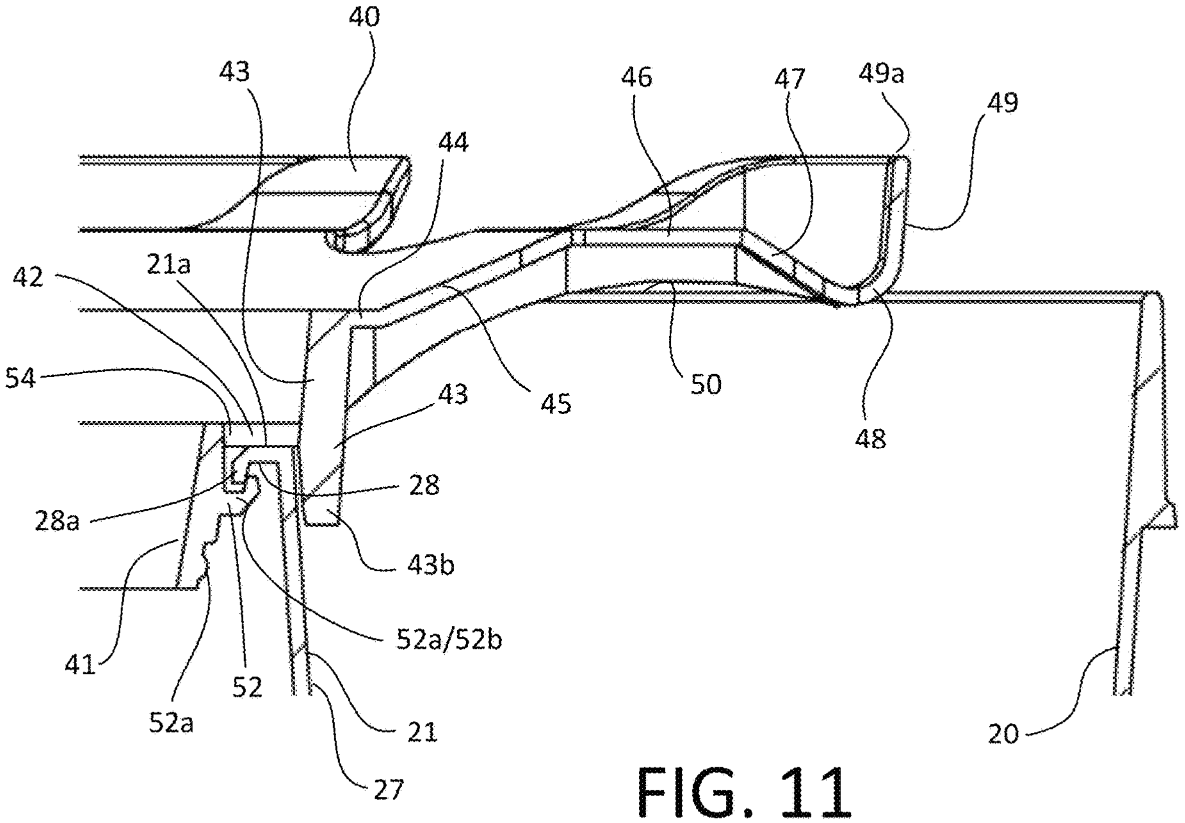
FIG. 11 illustrates a partial cross section side view of the annular cover and annular body of the cassette as shown in FIG. 8.
Figure 12:
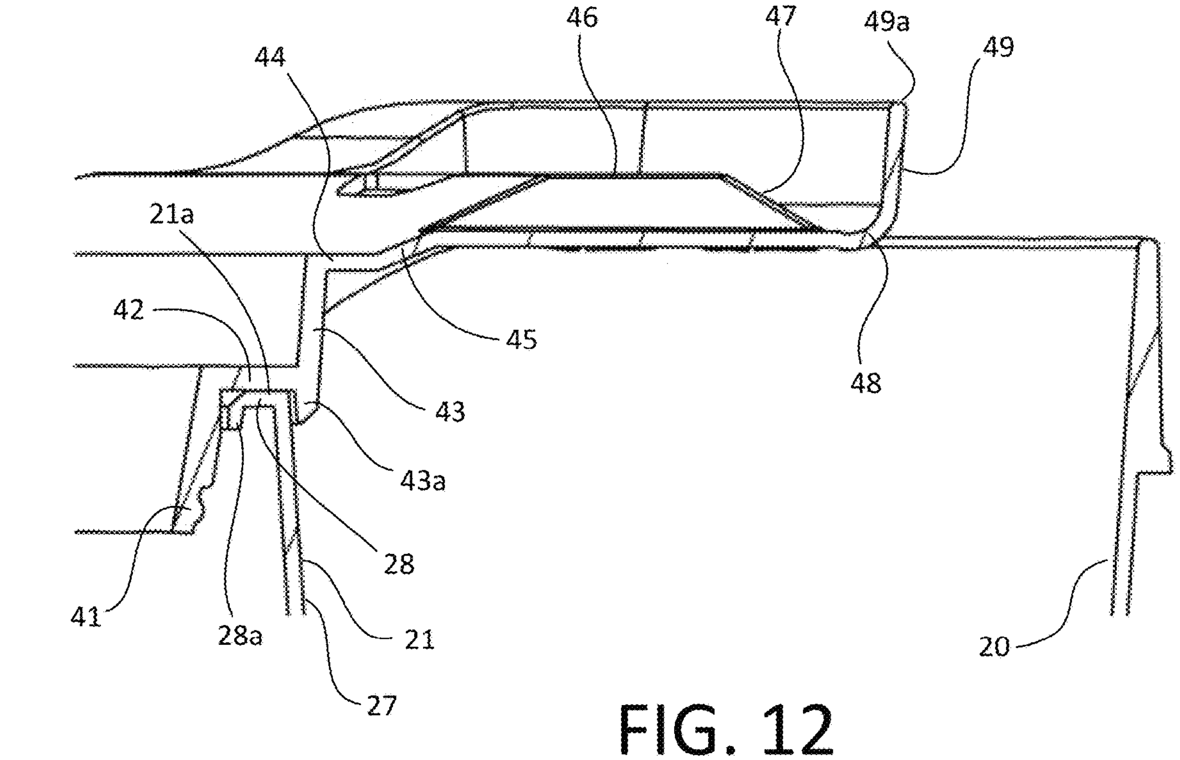
FIG. 12 depicts a partial cross section side view of the annular cover and annular body of the cassette as shown in FIG. 9.

FIG. 2 shows that the annular cover 40 may be constructed with a series of vertical, angled and horizontal walls from the inner cylindrical wall 41 to the outer concentric edge 49 (as shown in greater detail in the cross-section views in FIGS. 11-12). The inner cylindrical wall 41 is connected to a first horizontal wall 42, which radially extends outward and terminates at a second cylindrical wall 43. The second cylindrical wall 43 is connected to a second horizontal wall 44, which radially extends outward and terminates at an upward angular wall 45. The upward angular wall 45 is connected to the upper horizontal wall 46, which terminates at a downward angular wall 47. The downward angular wall 47 extends downward for a predetermined distance and then curves upward at a curved portion 48 and is connected to the outer concentric edge 49 that extends upward to an edge 49*a*.

The inner cylindrical wall 41, first horizontal wall 42, second cylindrical wall 43, second horizontal wall 44, upward angular wall 45, upper horizontal wall 46, downward angular wall 47, curved portion 48 and outer concentric edge 49 collectively may form the annular cover 40. It is to be understood, however, that the annular cover 40 may be constructed by any combination of the aforementioned segments to provide a cover of the U-shaped channel cross-section compartment.

Figure 3:
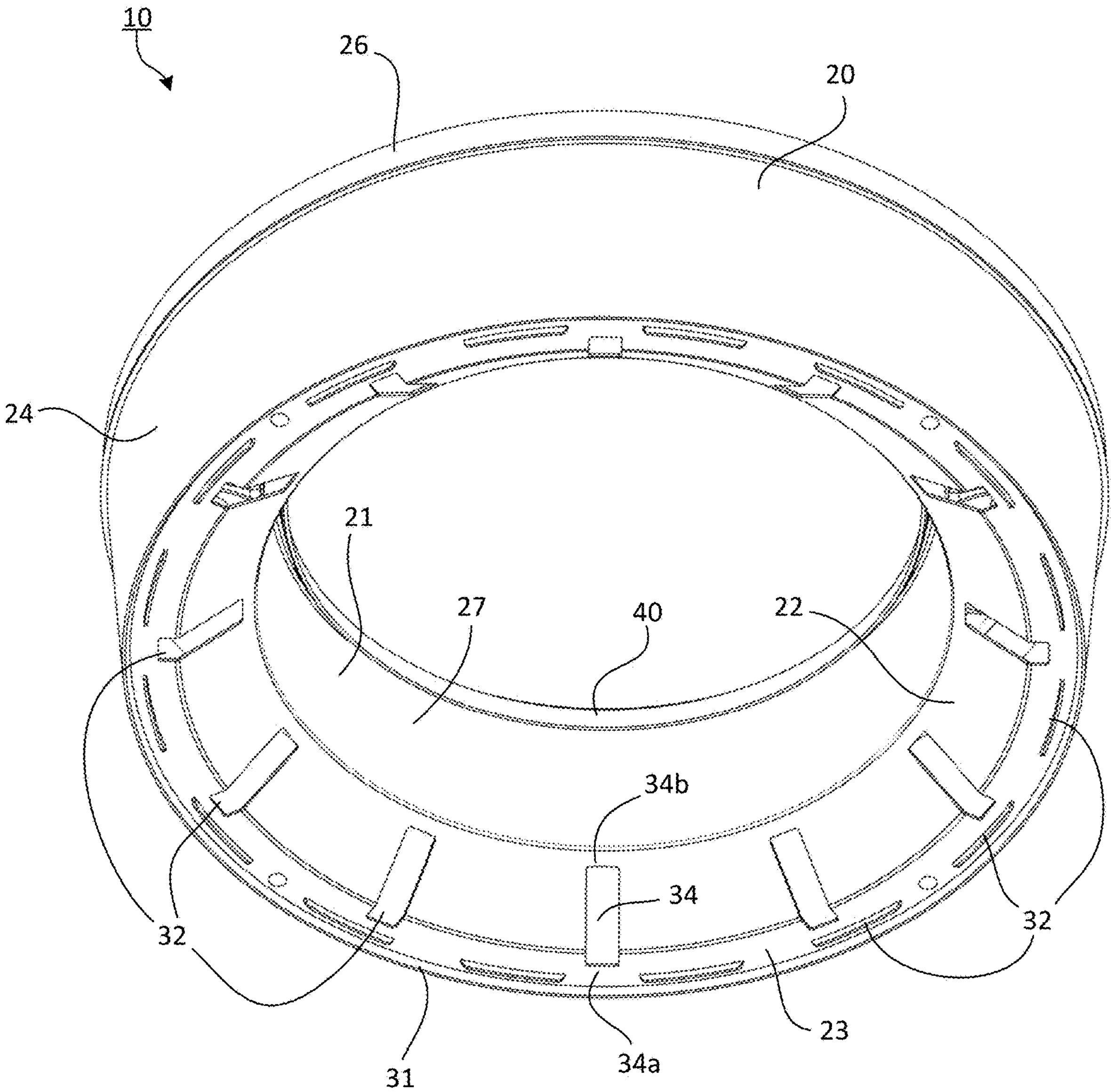
FIG. 3 illustrates a lower perspective view of the cassette.

FIG. 3 depicts a lower perspective view of the cassette 10. The lower annular body 20 includes an inner wall 21 connected to an angular wall 22. The angular wall 22 is connected to a bottom wall 23, which is connected to an outer wall 24. The outer wall 24 terminates at an upper end 26 thereof. The inner wall 21, angular wall 22, bottom wall 23 and outer wall 24 collectively form the U-shaped channel cross-section of a housing into which a pack 82 of a pleated flexible tubing 80 is received, as shown in FIG. 14.

Figure 14:
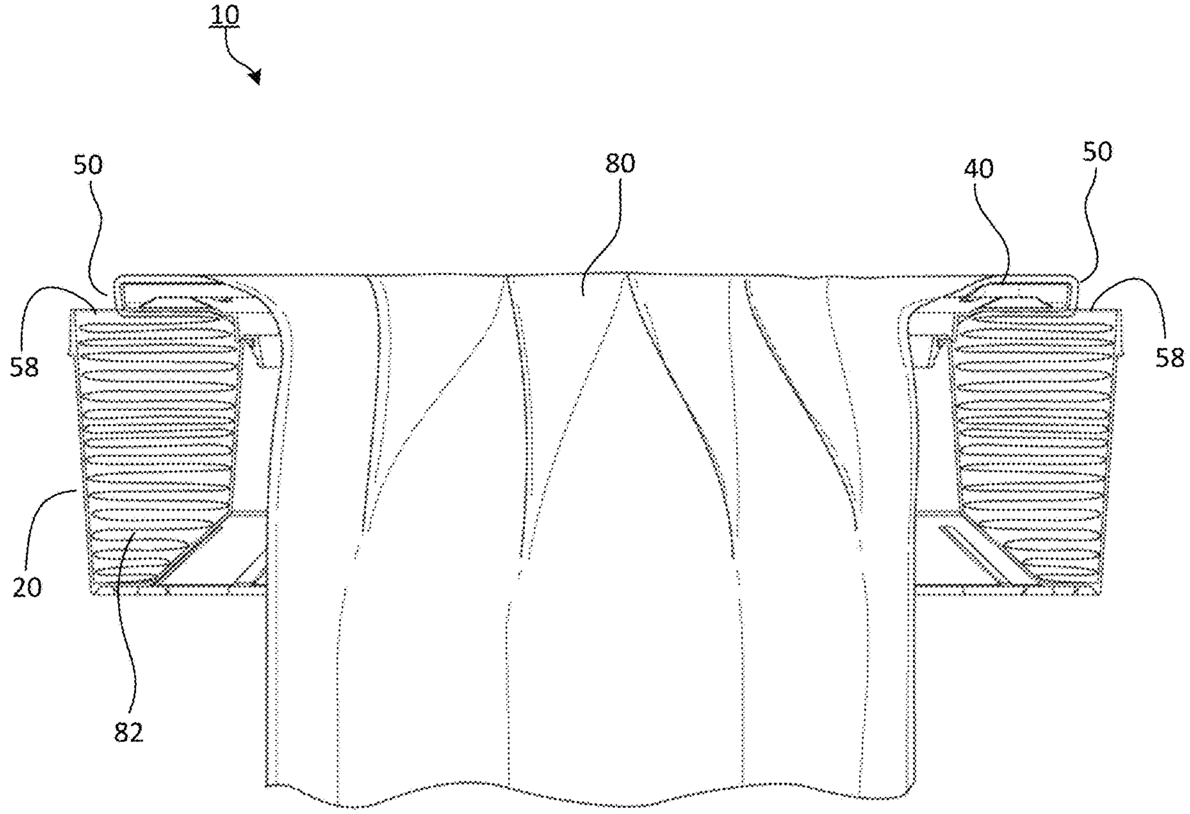
FIG. 14 illustrates a cross section view of the cassette having a flexible tubing disposed therein.

The lower configuration of the U-shaped channel cross-section and/or the angular configuration taken by the angular wall 22 may take a variety of different suitable angles in order to allow air to escape from below during the packing of the flexible tubing 80 into the lower annular body 20 as a packed tubing 82 as shown in FIG. 14 and described in more detail later. For example, the angular wall may be directly connected between the outer wall 24 and the inner wall 21, without the need for a bottom wall 23.

FIG. 3 illustrates the bottom wall 23 of the annular body 20 may also have a bottom lip 31, a plurality of concentric downward projections 32 and a plurality of apertures 34. The bottom lip 31 may be an extension of the outer wall 24 which extends past the bottom wall 23. The bottom lip 31 and downward projections 32 may provide an alignment feature for stacking multiple cassettes 10. A diameter of the bottom lip 31 may be sized such that when a first cassette 10 is stacked on the top of a second cassette 10, either the inside or outside face of the bottom lip 31 will nest the upper end 26 of the annular body 20. Furthermore, the concentric downward projections 32 may also provide a nesting function such that, the upper end 26 of the second cassette 10 is nested in between the bottom lip 31 and the concentric downward projections 32 or is nested inside the downward projections 32.

FIGS. 3-6 illustrate the plurality of apertures 34 that may be disposed in a radial configuration in the lower end of the annular body 20. As shown, the apertures 34 may be elongated, radially extending inwardly lengthwise from a first end 34*a* disposed in the bottom wall 23, to a second end 34*b* inwardly extending adjacent to the intersection of the angular wall 22 and the inner wall 21. The apertures 34 may be cut into the angular wall 22 and the bottom wall 23 and disposed concentrically about in a radial pattern.

The apertures 34 provide various advantages. First, during installation of the air-tight packing of the flexible packed tubing 82 into the U-shaped lower annular body 20, the various apertures 34 serve as vent holes allowing air trapped below the packed tubing 82 to vent out of the lower annular body 20 through the apertures 34. The venting provided by the various apertures 34 allow the packed tubing 82 to be compressed tightly as a pleated mass within the U-shaped lower annular body 20 without air interfering with the volume within the lower annular body 20 that could otherwise be filled by the packed tubing 82. As a result, no air is trapped below the packed tubing 82 thereby allowing a tighter pack to be obtained so that more of the flexible tubing 80 in the compressed packed tubing 82 state can be stored within the lower annular body 20 during assembly of the tubing 80 into the cassette 10. It is understood that the aperture 34 may be constructed into any one, or more, of the various walls 21, 22, 23, 24, or the like.

Another significant advantage to the apertures 34 is the ability to control the rotation of the cassette 10. The apertures 34 may function as key holes into which a mating key of a rotation mechanism can be used to control the rotation of the cassette 10 during operation of a unit (such as a waste receptacle) into which the cassette 10 may be placed and used. That is, a key may be aligned to mate with at least one of the apertures 34. The key may engage any portion of the aperture 34 on any wall 21, 22, 23, 24 surface and cause the cassette 10 to rotate, or prevent the cassette 10 from rotating by arresting the movement of the cassette 10.

Although the apertures 34 are shown as equidistant symmetric elongated rectangular slots extending across the angular wall 22 and the inner wall 21, it is possible to vary the number of apertures 34, their placement, the size and/or shape of the various apertures 34 to any number, size, symmetry or shape according to this subject disclosure. Likewise, is it also possible to extend the aperture 34 into the outer wall 24, or alternatively provide the apertures 34 on any one, or more, of the inner wall 21, the angular wall 22, the bottom wall 23 or the outer wall 24.

Figure 4:
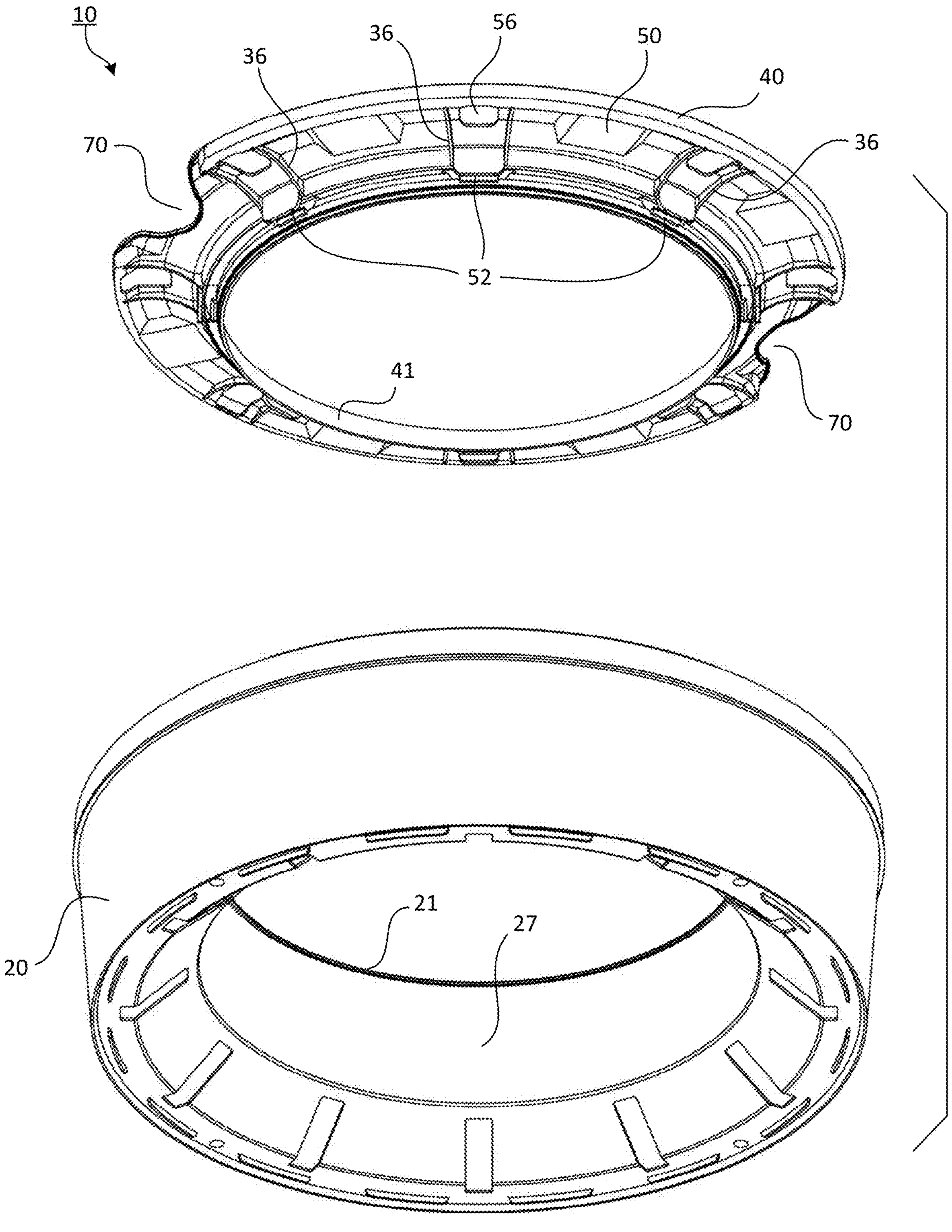
FIG. 4 depicts an exploded lower perspective view of the annular cover and annular body of the cassette.
Figure 4A:
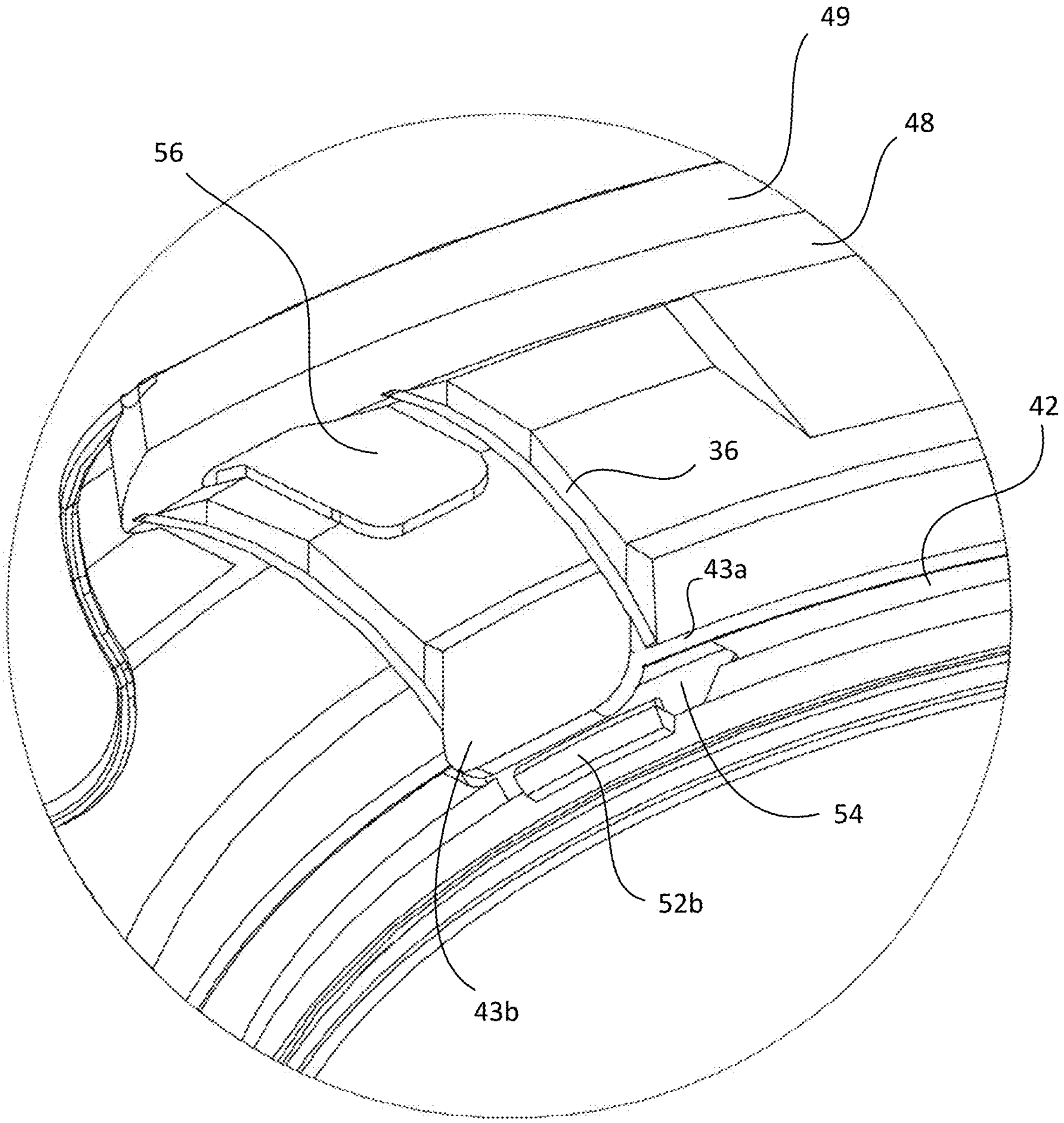
FIG. 4A depicts a partial exploded lower perspective view of a section of the annular cover as shown in FIG. 4.
Figure 5:
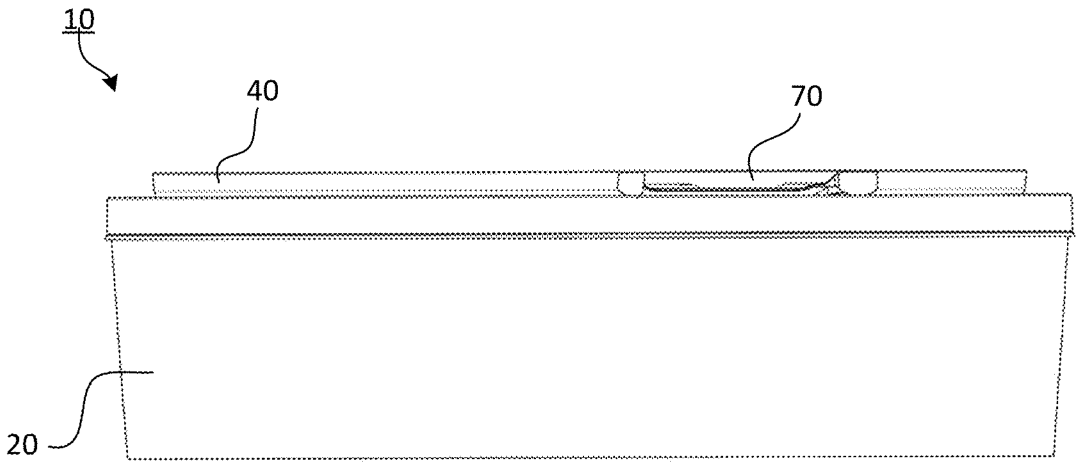
FIG. 5 shows a side view of the cassette.
Figure 6:
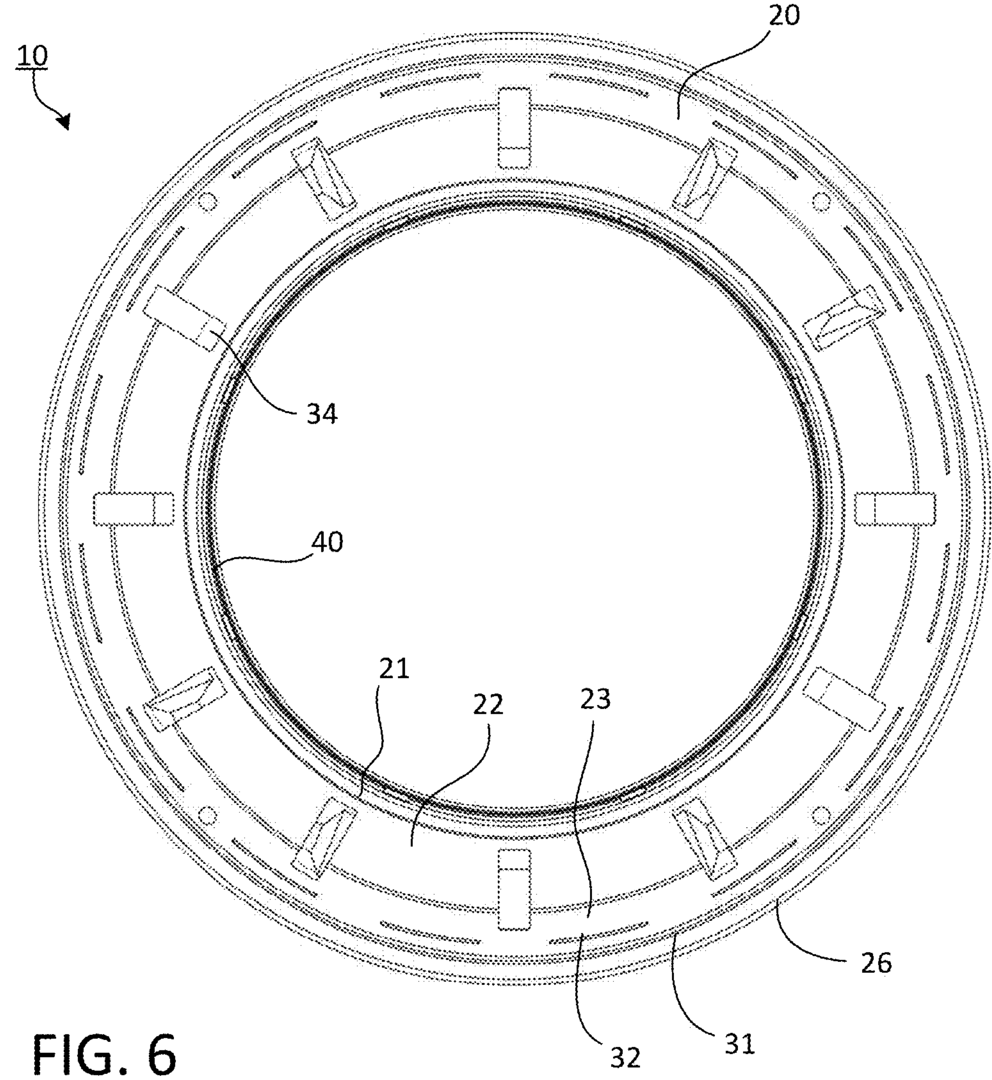
FIG. 6 illustrates a bottom view of the cassette.
Figure 7:
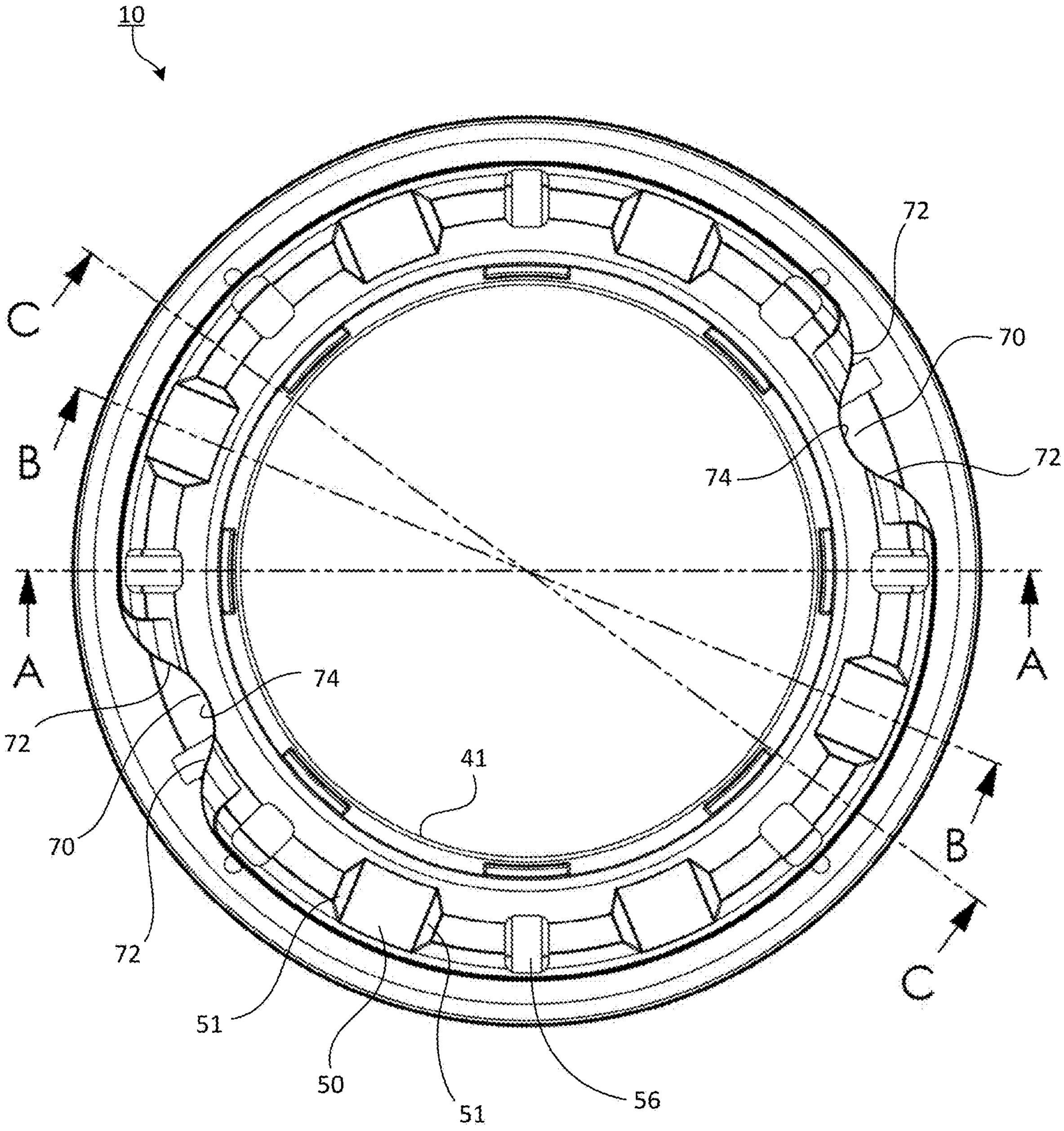
FIG. 7 depicts a top view of the cassette.
Figure 8:
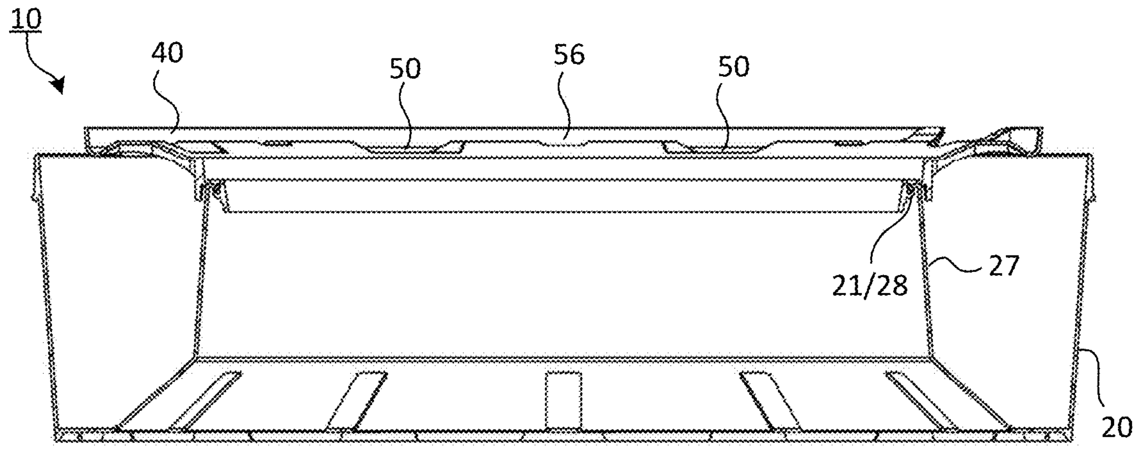
FIG. 8 illustrates a cross section side view of the annular cover and annular body of the cassette at through holes of the annular cover about line A-A in FIG. 7.
Figure 9:
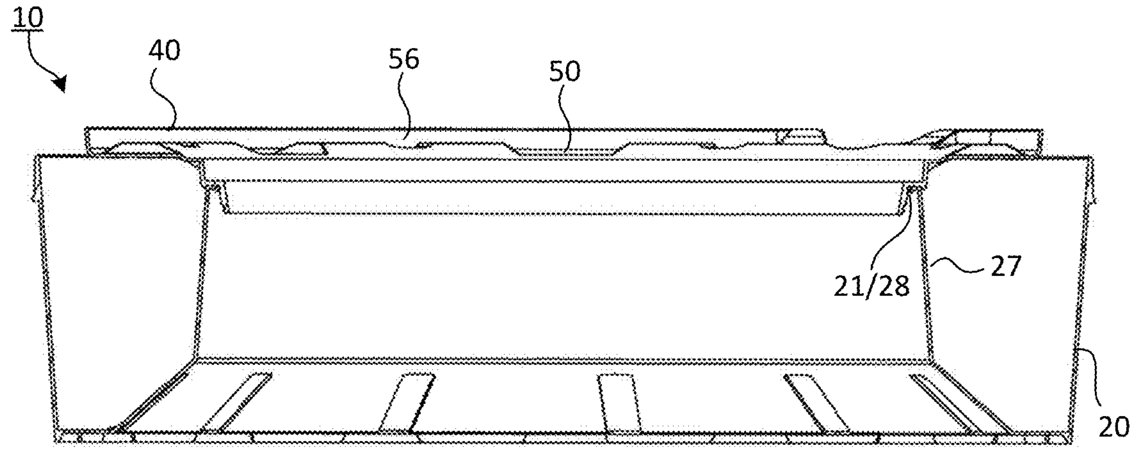
FIG. 9 depicts a cross section side view of the annular cover and annular body of the cassette at an access hole and recessed plateau of the annular cover about line B-B in FIG. 7
Figure 10:
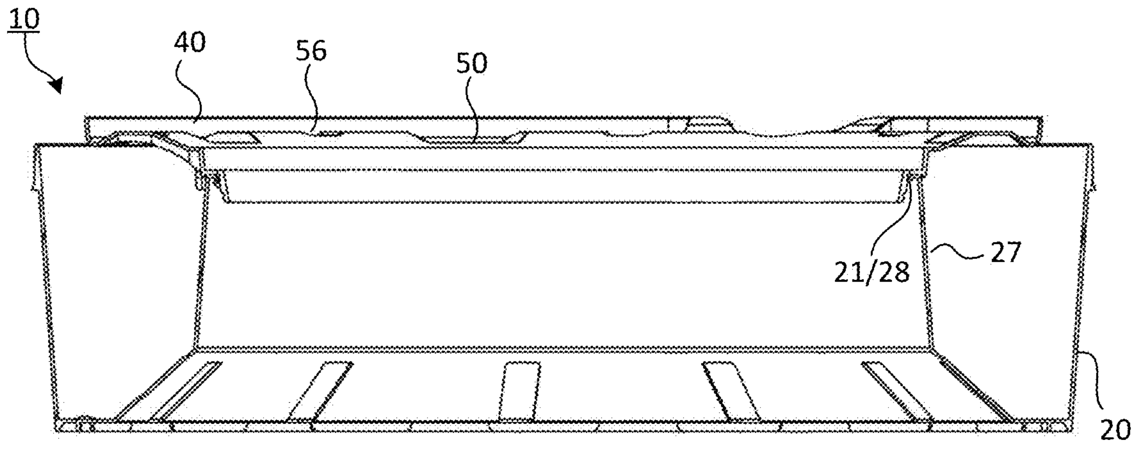
FIG. 10 shows a cross section side view of the annular cover and annular body of the cassette at an upper horizontal wall about line C-C in FIG. 7.

FIGS. 4 and 4A depict an exploded and enlarged lower perspective view of the annular cover 40 and annular body 20 of the cassette 10. An inner surface of the inner cylindrical wall 41 may have a projection 52 which engages the annular body 20 to attach the annular cover 40 to the annular body 20, as will be discussed in greater detail below.

The annular cover 40 may also have a series of reinforcing bridges 36 along an underside thereof. An axis of each reinforcing bridge 36 may extend outward radially from a center of the annular cover 40. The reinforcing bridges may span from the inner cylindrical wall 41 to the outer concentric edge 49, or any portion thereof. The reinforcing bridges 36 structurally support the annular cover 40 to retain its shape as the flexible tubing 80 is pulled through the opening 58 over and through the center of the cassette 10.

FIGS. 7-13 depict various top views of the lower annular body 20 and the annular cover 40. The annular cover 40 is disc shape and has a central through hole defined by an inner cylindrical wall 41. The inner cylindrical wall 41 extends upward to a first horizontal wall 42. The first horizontal wall 42 extends from a first end inward to a second cylindrical wall 43. The second cylindrical wall 43 extends upward to a second horizontal wall 44 that is elevated above the first horizontal wall 42. At the lower end of the second cylindrical wall 43 a retaining flange or concentric shoulder 43*a*, 43*b* is formed that extends slightly below the lower surface of the first horizontal wall 42. The second horizontal wall 44 extends radially outward to an upper angular wall 45. The upper angular wall 45 extends radially upward and outward at an angle to an upper horizontal wall 46. The upper horizontal wall 46 extends radially outward to a downward angular wall 47. The downward angular wall 47 extends radially downward from a first end to a curved portion 48. The curved portion 48 has a slight u-shape that returns the shape of the annular cover back upward into an outer concentric edge or wall 49.

The annular cover 40 is attached to the lower annular body 20 at an annular downturned lip 28 provided at a top edge 21*a* of the inner concentric wall 21 defining the central cylindrical core 27. The downward turned lip 28 constructed at the top edge 21*a* of the central cylindrical core 27 is nestled within a cup shaped structure defined by the inner cylindrical wall 41, the first horizontal wall 42 and the concentric shoulder 43*a*, 43*b* disposed at the bottom of the second cylindrical wall 43. As shown in FIGS. 11-12, the concentric shoulders 43*a*, 43*b* extend radially around and captivates the top edge 21*a* of the inner concentric wall 21 to secure the annular cover 40 to the lower annular body 20. It is to be understood that the inner cylindrical wall may take a variety of different configurations to provide additional support to the connection between the lower annular body 20 and the inner cylindrical wall 41 of the annular cover 40. The thickness of the inner cylindrical wall 41 may be selectively thickened to provide a secure connection and to prevent the annular cover 40 from disengaging from the lower annular body 20. Alternatively, bonding, an adhesive and/or any other suitable securing method may be applied between the annular cover 40 and the lower annular body 20 to ensure a secure connection.

The shorter concentric shoulder 43*a* may be extended intermittently and constructed with intermittent extending flanges 43*b* or return walls, such as shown in exploded view in FIG. 4A. The advantage of providing the intermittent extending flanges 43*b* is to be able to more securely captivate and secure the top edge 21*a* of the inner concentric wall 21 within the cup shaped structure defined by the inner cylindrical wall 41, the first horizontal wall 42 and the concentric shoulder 43*a*, 43*b* disposed at the bottom of the second cylindrical wall 43. The intermittent extending flanges 43*b* may extend to, or at least beyond the width of the annular downturned lip 28 disposed at the top edge 21*a* of the inner wall 21. The intermittent extending flange 43*b* may extend to at least the height of the protrusion 52*b* disposed on the inside of the inner cylindrical wall 41.

The grooves 70 are adapted to receive an indexing mechanism to manipulate the orientation of the cassette 10. For example, a user can manually use the grooves to engage with their fingers to manually twist the annular cover 40 into a desired position. The advantage to providing this feature is to manually rotate the cassette 10 via the top of the lower annular body 20.

Figure 1A:
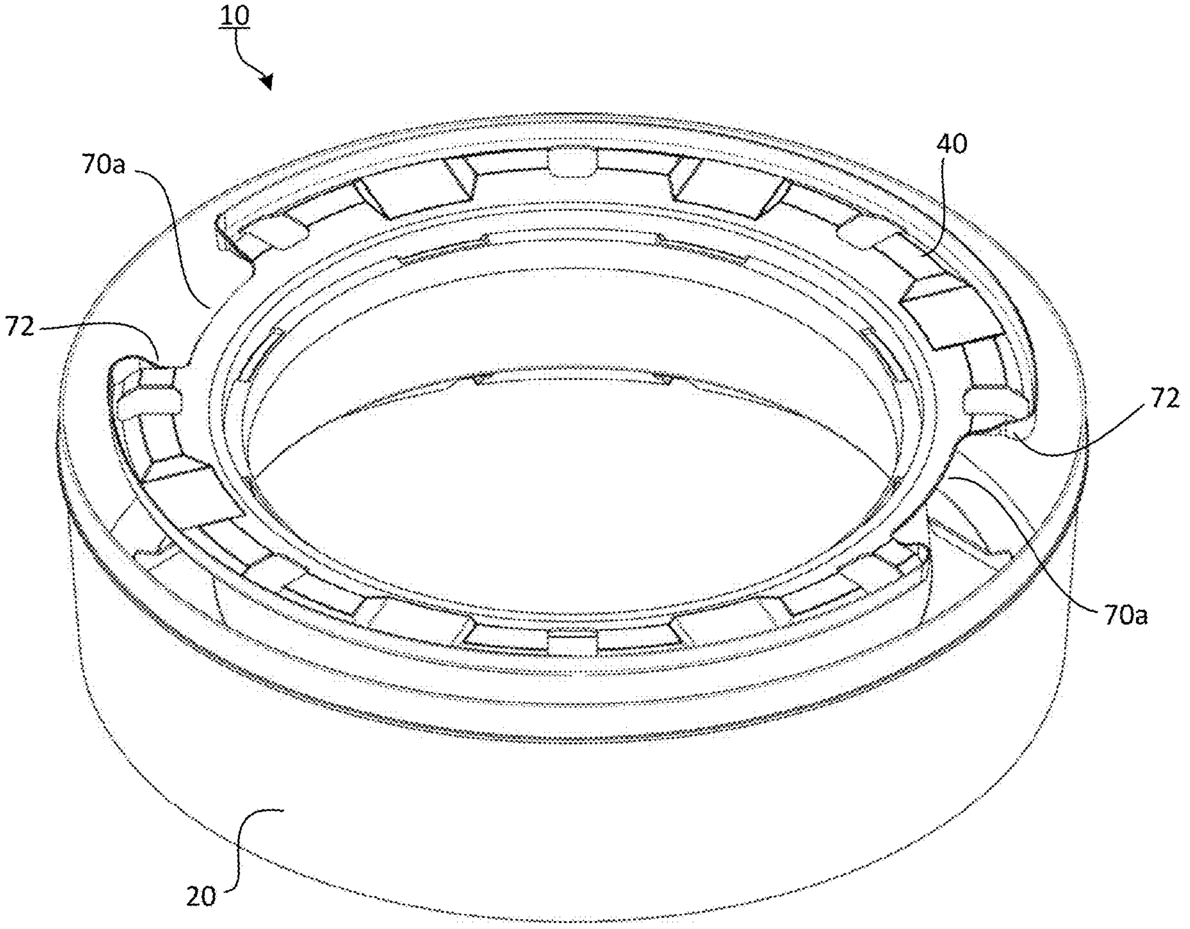
FIG. 1A shows an alternative upper perspective view of a cassette with a different engagement groove configuration.

By way of example shown in FIG. 1A, the construction of the grooves 70, 70*a* may take a variety of different sizes, shapes and/or configurations according to this subject disclosure. The outer edge surface of the grooves 72 may be constructed of a material and/or shape having a low coefficient of friction so that the tubing pulled over those surfaces is not torn, frayed or fatigued by a sharp corner of edge. Likewise, the annular cover 40 may be constructed without the grooves 70, 70*a*.

A plurality of apertures or through holes 56 may be provided on the top of the annular cover 40 for orientation purposes. Furthermore, the through holes 56 may be provided to allow aeration of a deodorant integrated with the material composition of the tubing material. The aeration through holes 56 can counteract any foul odor in the vicinity of the cassette 10, particular when the cassette 10 used in a waste disposal container or unit.

A plurality of adjacent elevated bosses and recessed plateaus may also be constructed around the upper surface of the annular cover 40. The elevated bosses and recessed plateaus are constructed by a plurality of recessed plateaus being straddled by elevated ledges 51 that support various upper horizontal walls 46 forming a step-like configuration about the top end of the annular cover 40. This construction has further advantages in permitting the cassette 10 to be rotated about the upper surface end of the annular cover 40.

As shown in FIGS. 11-12, in place, the annular cover 40 and the lower annular body 20 are lockingly engaged to one another as described above. To prevent the annular cover 40 from being disconnected from within the expanded inner wall 21 of the lower annular body 20, the annular cover 40 is lowered and positioned within an annular downturned lip 28 of the inner wall 21 of the annular body 20 so that a peripheral edge 28*a* of the lip 28 slides past a ramp 52*a* of the protrusion 52. As the peripheral edge 28*a* slides along the ramp 52*a*, the inner wall 21 will deflect outward away from the center of the annular body 20 and against the concentric shoulders 43*a*, 43*b*. When the peripheral edge 28*a* completely slides along the ramp 52*a*, it will snap inward and rest above a locking shelf 52*b* and against the concentric shoulders 43*a*, 43*b* as shown in FIGS. 11-12.

The peripheral edge 28*a* of the annular downturned lip 28 is then locked against the locking shelf 52*b* of the projection 52. The projection 52 functions as a detent and the concentric shoulders 43*a*, 43*b* act as a captivating stop so that the annular cover 40 is mechanically arrested and cannot be undesirably lifted or raised off of the lower annular body 20 after the peripheral edge 28*a* has been securely mounted against the locking shelf 52*b* and the concentric shoulders 43*a*, 43*b*. In use, the flexible tubing 82 disposed within the cassette 10 is withdrawn with sufficient force upward from within the u-shaped lower annular body 20 and then over and downward over the annular cover 40 and into the cylindrical core 27 to cause the cassette to be jostled within the container it is situated. Unlike conventional designs before, the socket connection of this subject disclosure between the u-shaped lower annular body 20 and the annular cover 40 is sufficiently secure to prevent the shape of the cassette to be warped and the annular cover 40 disengaged from the lower annular body 20.

Access holes 54 are disposed in the first horizontal wall 42. The access holes 54 are provided to allow visual alignment of the top edge 21 of the annular downturned lip 28 into the socket area constructed by the concentric shoulders 43*a*, 43*b*, the first horizontal wall 42, the inner horizontal wall 41 and the locking flange 52.

FIG. 14 depicts the tubing 80 shown as a packed tubing 82 disposed in the U-shaped channel cross-section of the lower annular body 20. The packed tubing 82 is adapted to be received and pulled upward from within the U-shaped channel, through the opening 58, up and over the outer concentric edge 49, across the annular cover 40, and downward through the central cylindrical core 27 opening. The tubing 80 may be made from a variety of different materials. The tubing 80 may be made of various compositions and may also be scented.

Figure 15:
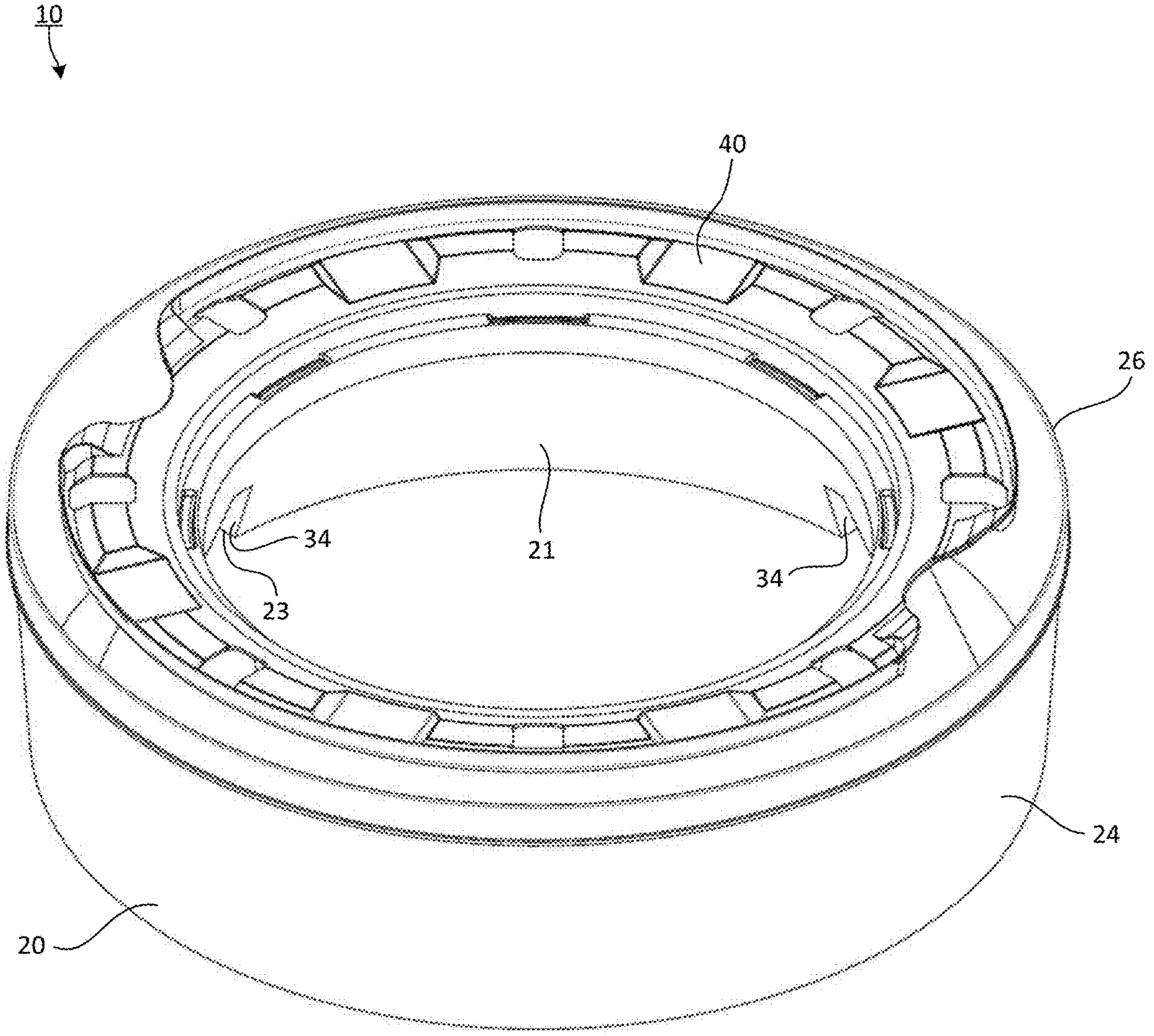
FIG. 15 depicts a top perspective view of an alternate exemplary embodiment of the cassette.
Figure 16:
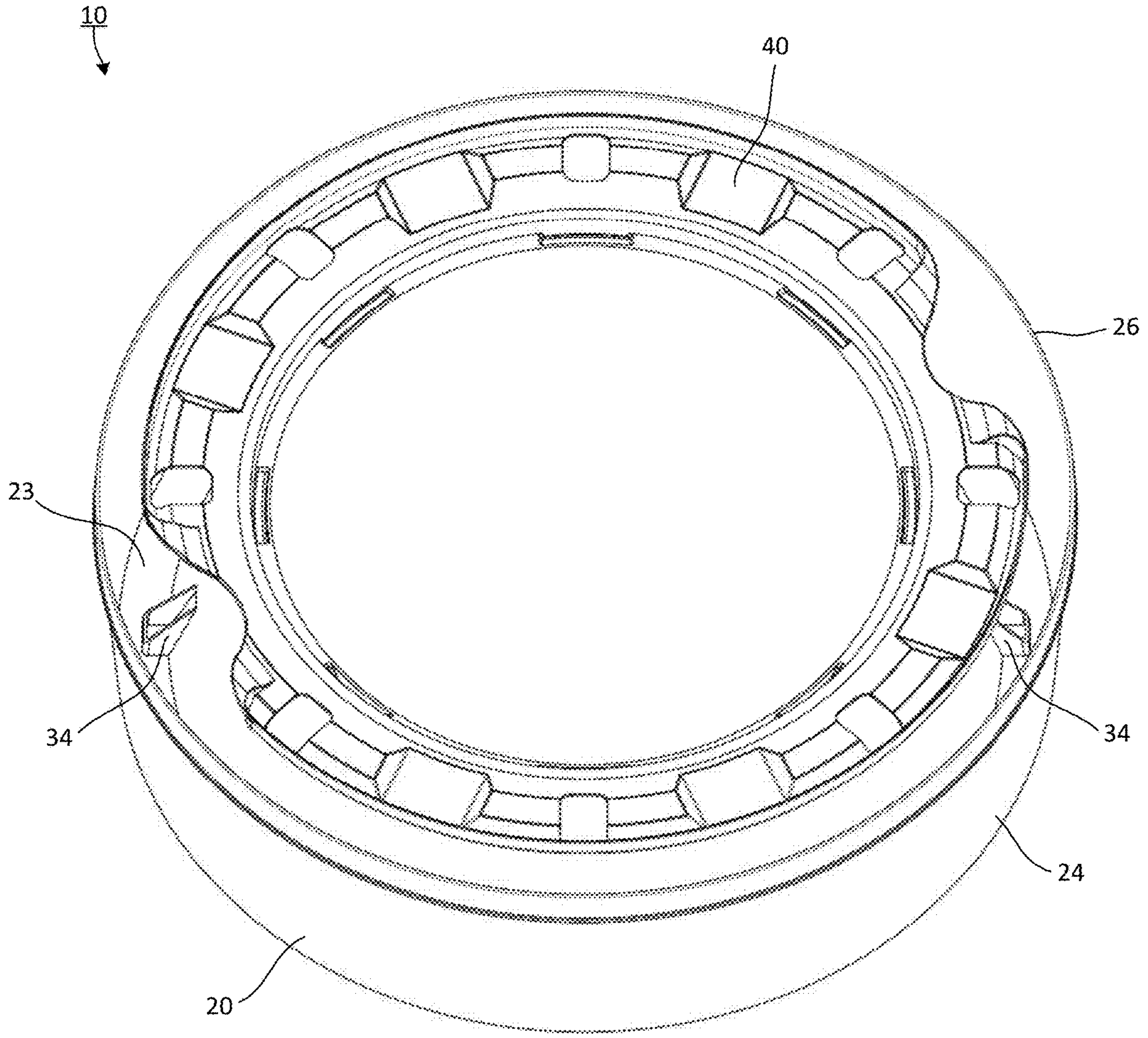
FIG. 16 depicts a second top perspective view of the cassette shown in FIG. 15.

FIGS. 15-35 depict an alternate exemplary embodiment of the cassette 10 for dispensing pleated tubing. As shown in FIGS. 15-16, the cassette 10 is fitted with an annular cover 40 that attaches to the lower annular body 20. The lower annular body 20 has a lower closed channel cross-section compartment comprising an inner wall 21 connected to a bottom wall 23 (shown in FIGS. 17 and 20), which is connected to an outer wall 24. The outer wall 24 terminates at an upper end 26 thereof. The inner wall 21, bottom wall 23 and outer wall 24 collectively form the lower closed channel cross-section of a housing into which a pack 82 of a pleated flexible tubing 80 is received. FIGS. 15-18 show various tilted perspective views of the cassette 10 with and without the annular cover 40. Two of a plurality of apertures 34 are shown disposed in the bottom of the lower annular body 20. In tilted perspective view FIG. 15, the apertures 34 are shown from an outer surface view of inner wall 21. In tilted perspective views FIGS. 16-18, the apertures 34 are illustrated from within the lower annular body 20.

Figure 15A:
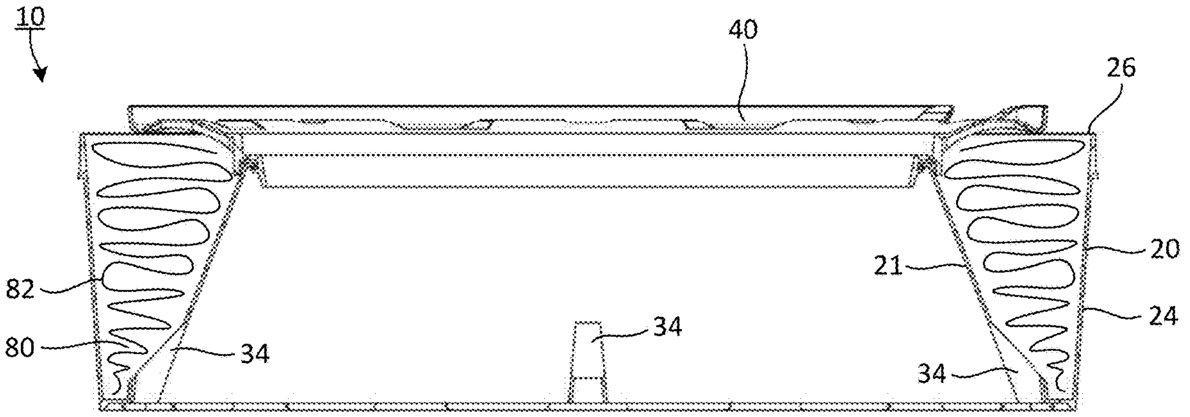
FIG. 15A illustrates a cross section view of the cassette fitted with the annular cover and having a flexible tubing disposed therein.

FIG. 15A is a cross section view of the cassette 10 fitted with the annular cover 40 and containing the pack 82 of the pleated flexible tubing 80 in the lower annular body 20. The outer wall 24, bottom wall 23 and inner wall form the lower closed channel cross-section compartment that houses the pleated flexible tubing 80. The outer wall 24 terminates at an upper limit at the upper end 26 of the lower annular body 20. The cross-section is taken through two of the plurality of apertures 34, while a third aperture 34 is also shown.

Figure 15B:
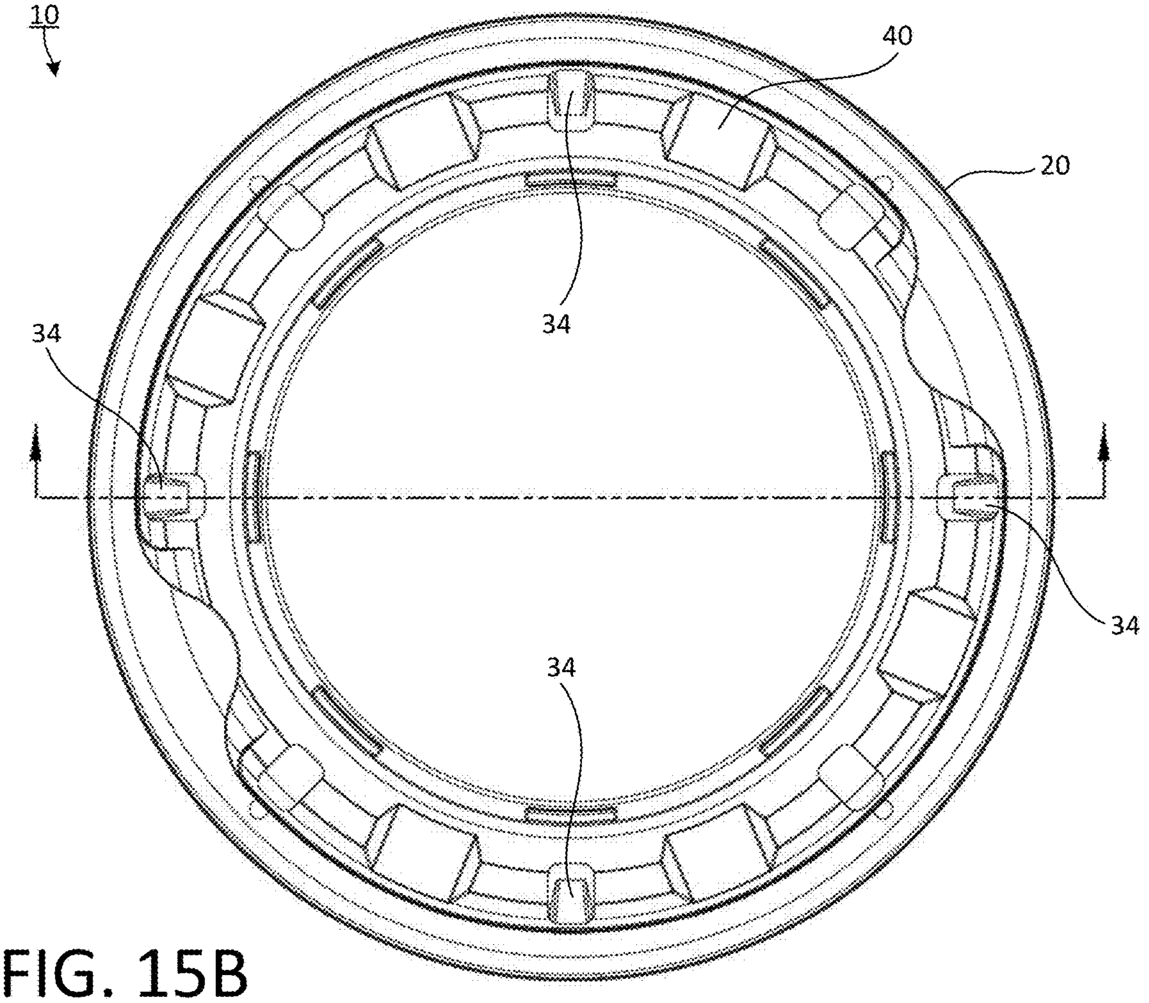
FIG. 15B illustrates a top view of the cassette fitted with the annular cover.

FIG. 15B is a top view of the cassette 10 fitted with the annular cover 40. The annular cover 40 is secured to the lower annular body 20.

Figure 17:
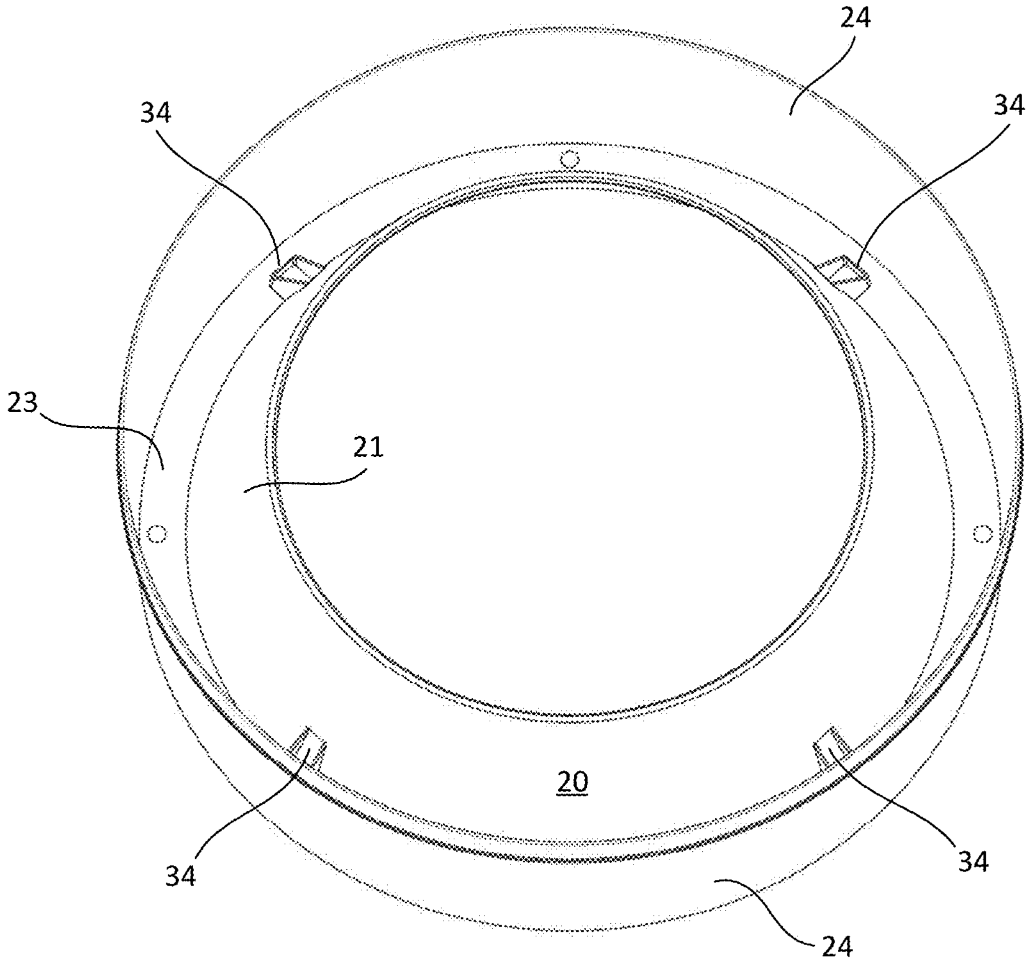
FIG. 17 shows a third top perspective view of the cassette from FIG. 15 without an annular cover or pleated flexible tubing inside.
Figure 18:
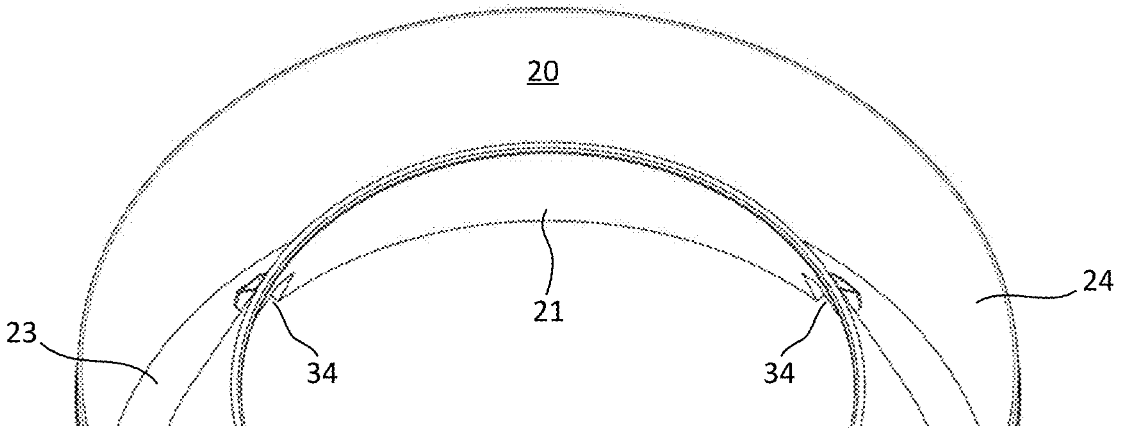
FIG. 18 illustrates a partial top perspective view of the cassette from FIG. 17 from an alternate viewing angle.

FIG. 17 is a top perspective view of the cassette 10 without the annular cover 40 or the pleated flexible tubing 80 that is housed in the internal compartment formed by the lower annular body 20. The plurality of apertures 34 in the lower annular body 20 may be elongated, radially extending inwardly from a first end 34*a* disposed in the bottom wall 23, to a second end 34*b* inwardly extending into the inner wall 21. FIG. 18 illustrates a partial top perspective view of the cassette 10 from an alternate viewing angle that shows the plurality of apertures 34 disposed partially inside and outside of the inner wall 21.

Figure 19:
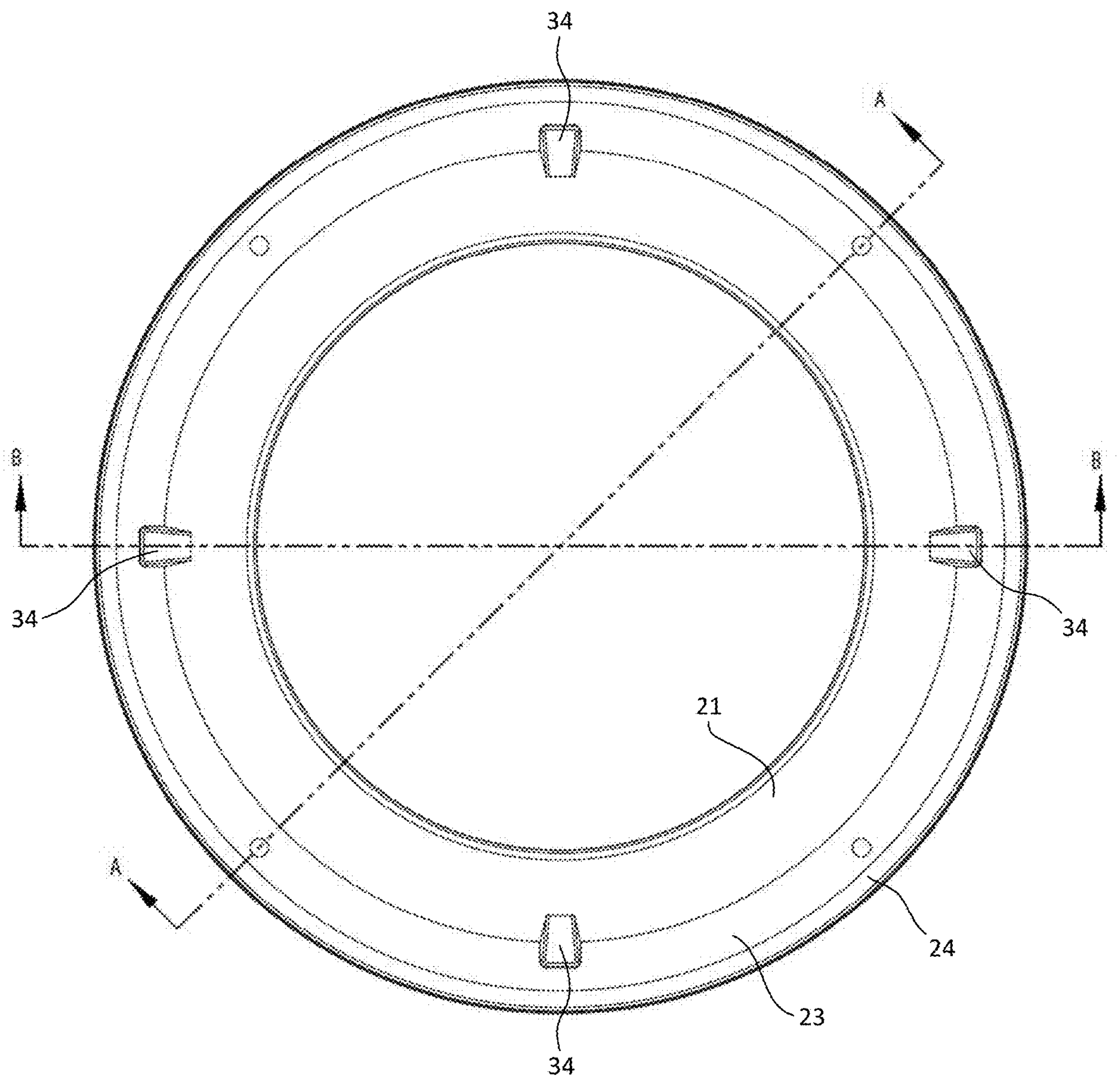
FIG. 19 shows a bottom view of the cassette from FIG. 17.

FIG. 19 is a bottom view of the cassette 10. In this embodiment, there are four apertures 34 set 90 degrees from each other. However, it is contemplated that a different number of apertures 34, offset by different measures of degree may be adopted. For example, there could be three apertures 34 offset at 120 degrees, or the apertures 34 could be offset from one another in a non-symmetrical pattern.

Figure 20:
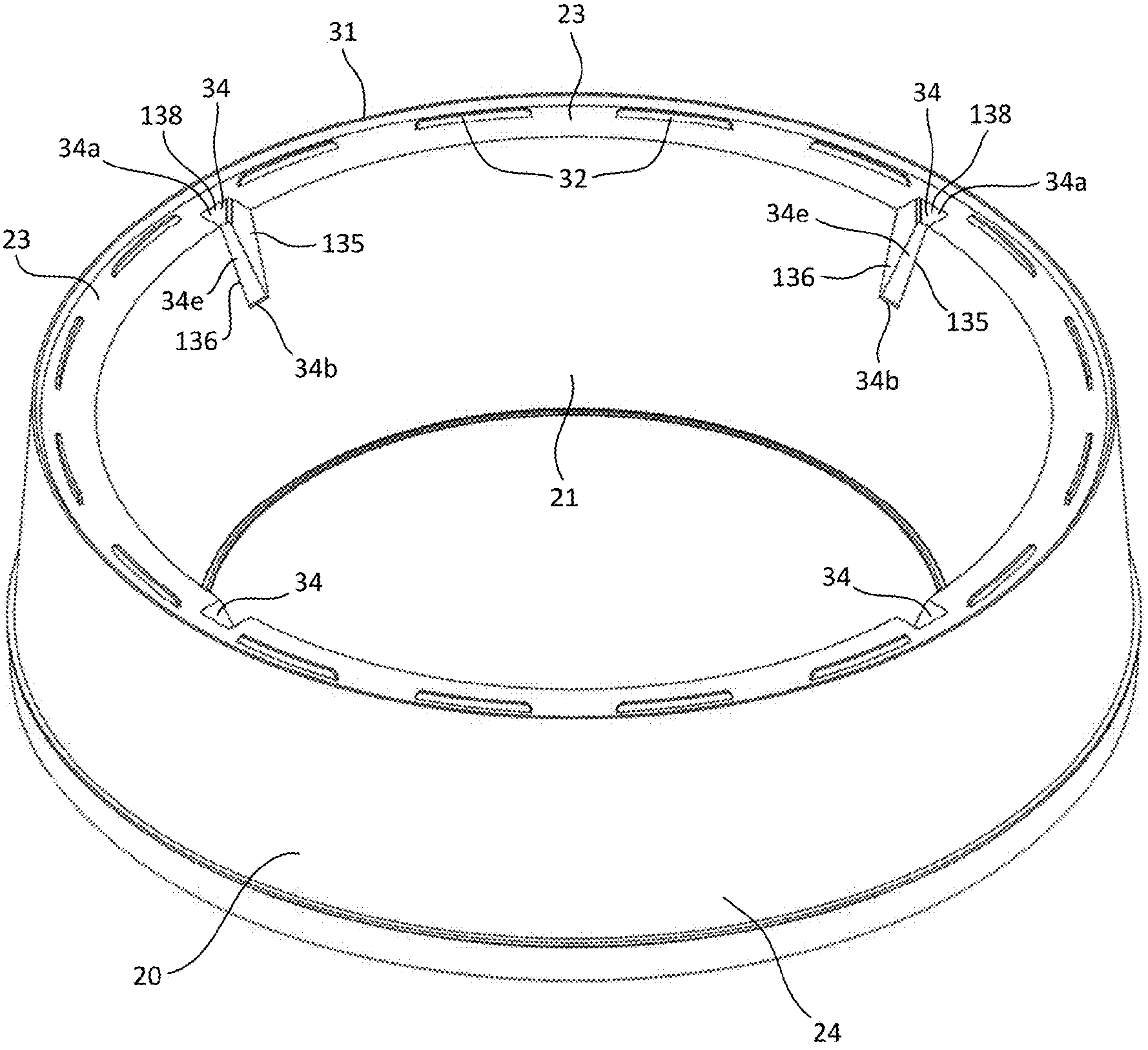
FIG. 20 illustrates a side perspective of the cassette from FIG. 17 that shows the bottom of the cassette.

FIG. 20 depicts a side perspective of the cassette 10 that shows the bottom of the cassette 10. The bottom wall of the annular body 20 may have a bottom lip 31, a plurality of concentric downward projections 32 and a plurality of apertures 34. The bottom lip 31 may be an extension of the outer wall 24 which extends past the bottom wall 23. The bottom lip 31 may be used for stacking and storing more than one cassette 10. The concentric downward projections 32 may also be used to orient and secure more than one cassette 10 when stacking or storing the cassettes 10. The concentric downward projections 32 also add structural support to the bottom wall 23 of the cassette 10. This added structural support is especially useful when loading the pleated flexible tubing 80 into the cassette 10.

As shown in FIG. 20, each individual aperture 34*e* has a gusset shape structure. That is, each individual aperture 34*e* has a first aperture sidewall 135, a second aperture sidewall 136 extending between the bottom wall 23 and the inner wall 21. A rear aperture wall 138 is disposed at a first end 34*a* of the aperture 34*e* and connects the first aperture sidewall 135 and the second aperture sidewall 136 at the first end 34*a*. The first aperture sidewall 135 and second aperture sidewall 136 extend from the first end 34*a* of the aperture 34*e* to a second end 34*b* of the aperture 34*e*. In the embodiment shown, the first end 34*a* of the aperture 34*e* is disposed in, and extending from the bottom wall 23 inward into the annular body 20. The second end 34*b* of the aperture 34 is disposed in the inner wall 21. However, it is contemplated that the gusset structure of the aperture 34 may be arranged in a variety of different positions. That is, the first end 34*a* and second end 34*b* may be located entirely in either the outer wall 24, the bottom wall 23, the inner wall 21 or any combination thereof. An advantage of the aperture 34 having a gusset shape is that alignment and positioning of the cassette 10 within the waste container 150 is much easier to obtain as will be described in more detail later.

Figure 21:
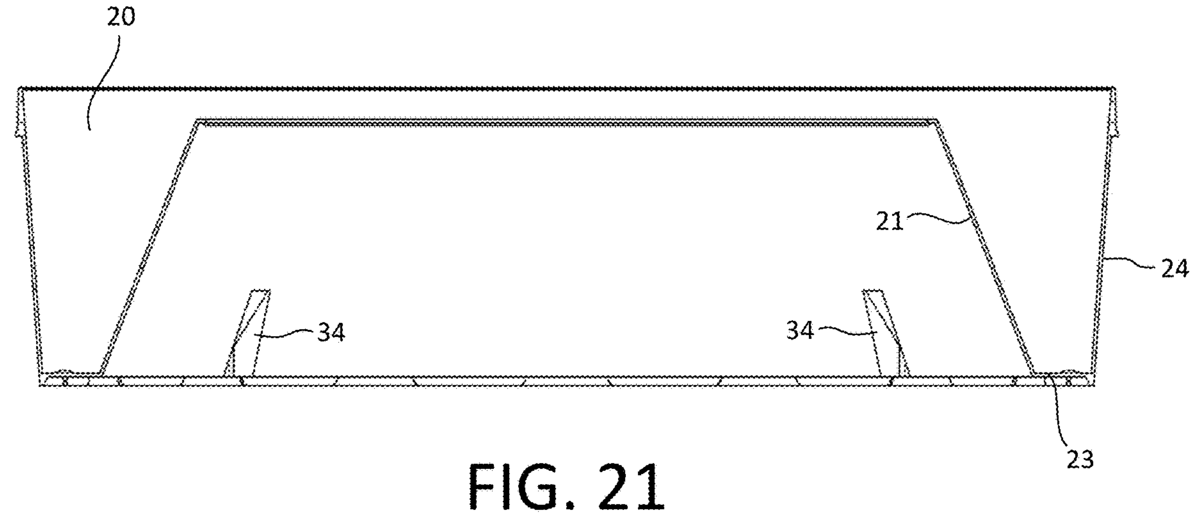
FIG. 21 shows a cross-section view of the cassette about line A-A in FIG. 19.
Figure 22:
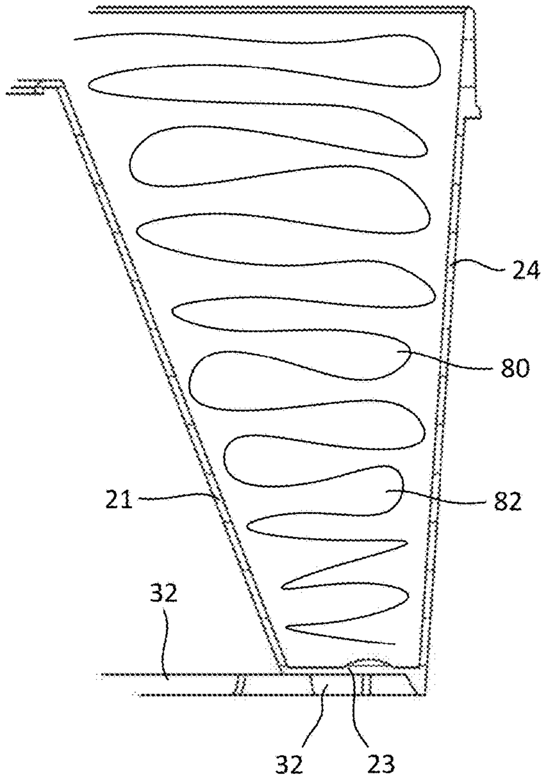
FIG. 22 is an exploded view of the cassette shown in FIG. 21.

FIG. 21 is a cross-section view of the cassette 10 about line A-A in FIG. 19. The generally U-shaped compartment of the lower annular body 20 is comprised of the inner wall 21, bottom wall 23 and outer wall 24. Two of the plurality of apertures 34 extending to the second end 34*b* are shown disposed in the inner wall 21. FIG. 22 is an exploded view of the cassette shown in FIG. 21 that provides more detail of the bottom lip 31 and upper end 26 of the outer wall 24.

Figure 23:
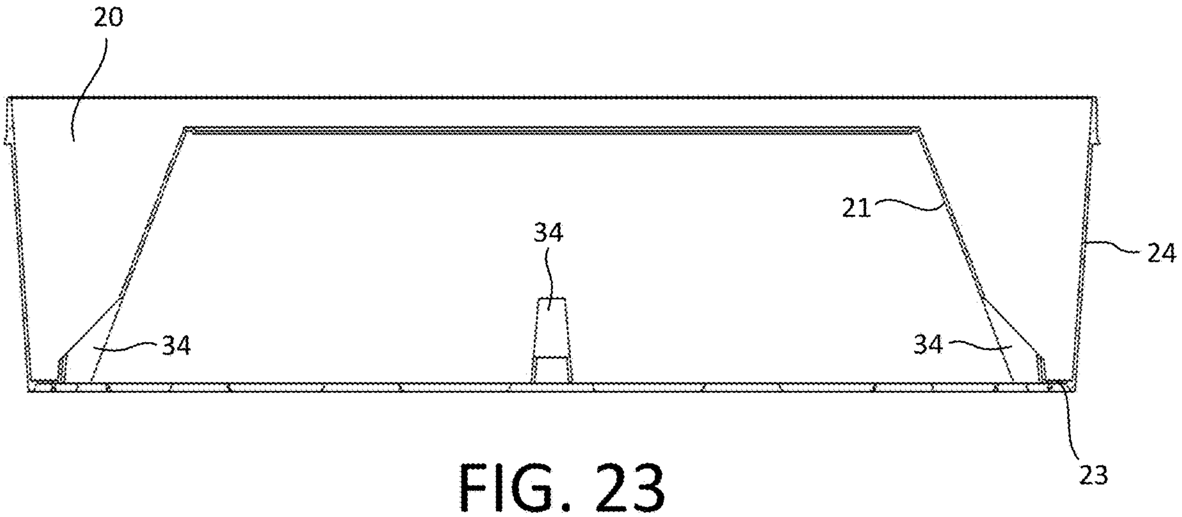
FIG. 23 shows a cross-section view of the cassette about line B-B in FIG. 19.
Figure 24:
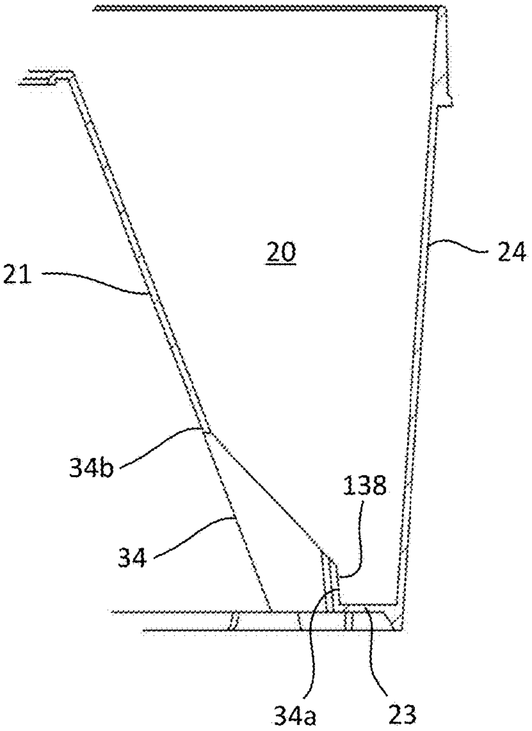
FIG. 24 is an exploded view of the cassette shown in FIG. 23.

FIG. 23 is a cross-section view of the cassette about line B-B in FIG. 19. This cross-section is taken through two of the plurality of apertures 34. FIG. 24 is an exploded view of the cassette 10 shown in FIG. 23 that partially shows the architecture of a single aperture 34*e*. The rear aperture wall 138 is disposed on the first end 34*a* of the aperture 34*e*. The first aperture sidewall 135 and second aperture sidewall 136 extend from the first end 34*a* of the aperture 34*e* to the second end 34*b* of the aperture 34*e*. The rear aperture wall 138 may be disposed deeper towards the outer wall 24, or shallower towards the inner wall 21. The depth of the rear aperture wall 138 and the height of the first and second aperture sidewalls 135,136 determine the angle of the opening of the aperture 34*e*. The width of the bottom wall 23 affects the overall shape of the plurality of apertures 34. It is contemplated that the first and second aperture sidewalls 135, 136 could be taller or shorter, and the rear aperture wall 138 deeper or shallower relative to inner wall 21.

Figure 25:
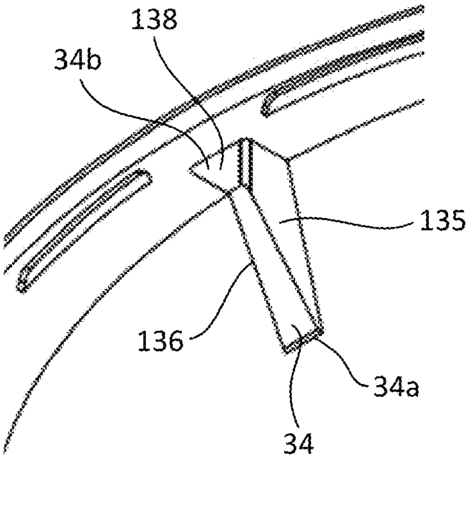
FIG. 25 is an exploded view of the cassette shown in FIG. 20.

FIGS. 25-28 show exploded views of the aperture 34*e* from several different viewing angles. FIG. 25 shows an aperture 34*e* from the perspective of one looking down at the bottom wall 23 of the cassette 10. From this angle it is possible to see a closer view of the plurality concentric downward projections 32 disposed on the bottom wall 23. The interior of the second aperture sidewall 135 and the rear aperture wall 138 are also shown.

Figure 26:
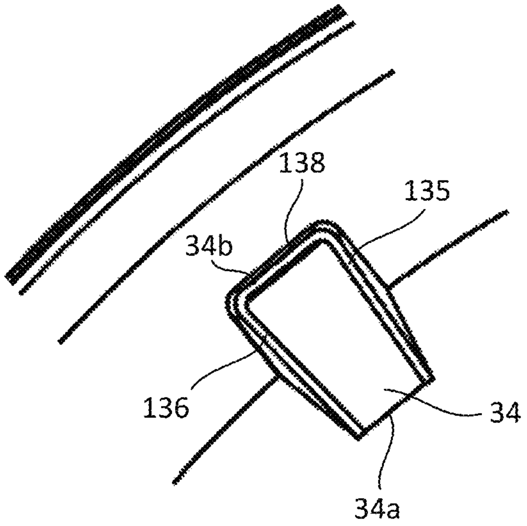
FIG. 26 is an exploded view of the cassette shown in FIG. 19.

FIG. 26 is an exploded view of the cassette 10 from FIG. 19 looking down on the bottom of the cassette 10. The contour of the aperture 34*e* is shown. The rear aperture wall 138 is closest to the outer wall 24 at a first end 34*a* of the aperture 34*e* and connected by the first and second aperture sidewalls 135, 136 to a second end 34*b* disposed in the inner wall 21. In this embodiment the rear aperture wall 138 is wider than the second end 34*b* of the aperture 34*e* such that the lines of the first and second aperture sidewalls 135, 136 would bisect if continued into the central cylindrical core 27. However, it is contemplated that the shape of the aperture 34*e* could adopt different configurations such that the lines of the first and second apertures 135, 136 are parallel, or more acute or obtuse relative to the length of the rear aperture wall 138.

Figure 27:
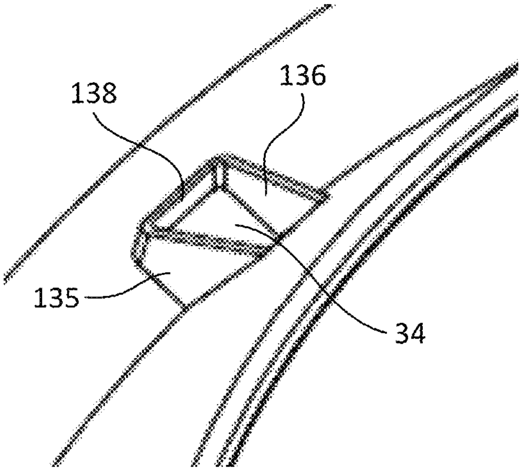
FIG. 27 is an exploded view of the cassette shown in FIG. 17.

FIG. 27 is an exploded view of the cassette 10 shown in FIG. 17 looking down into the inside of the lower annular body 20 of an empty cassette 10. This angle shows the exterior of the first aperture sidewall 135 and the interior of the second aperture sidewall 136. The top edge of the rear aperture wall 138 is also shown.

Figure 28:
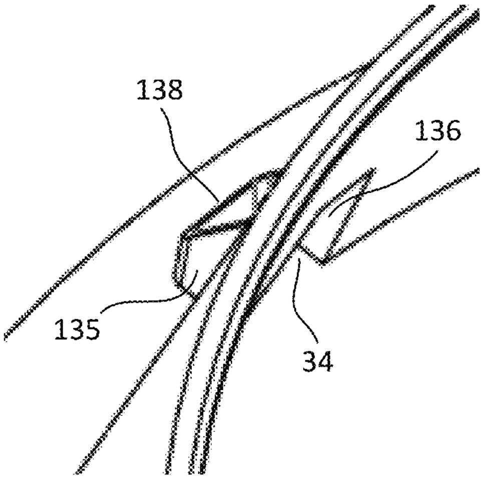
FIG. 28 is an exploded view of the cassette shown in FIG. 18.

FIG. 28 is an exploded view of the cassette 10 from FIG. 18 that shows the exterior of the first aperture sidewall 135, the interior of the rear aperture wall 138 and the interior of the second aperture sidewall 136. In this embodiment, the shape of the first and second aperture sidewalls 135, 136 are quadrilateral. However, it is contemplated that the first and second aperture sidewalls 135, 136 may have rounded edges, parallel lines or more or less sides depending on the configuration of the complementary alignment projections 161 of the waste container 150. Alternatively, the apertures may be substantially circular, semi-circular, elliptical, triangular, crescent-shaped, T-shaped, V-shaped, or the like, with one or more walls corresponding to the shape.

Figure 29:
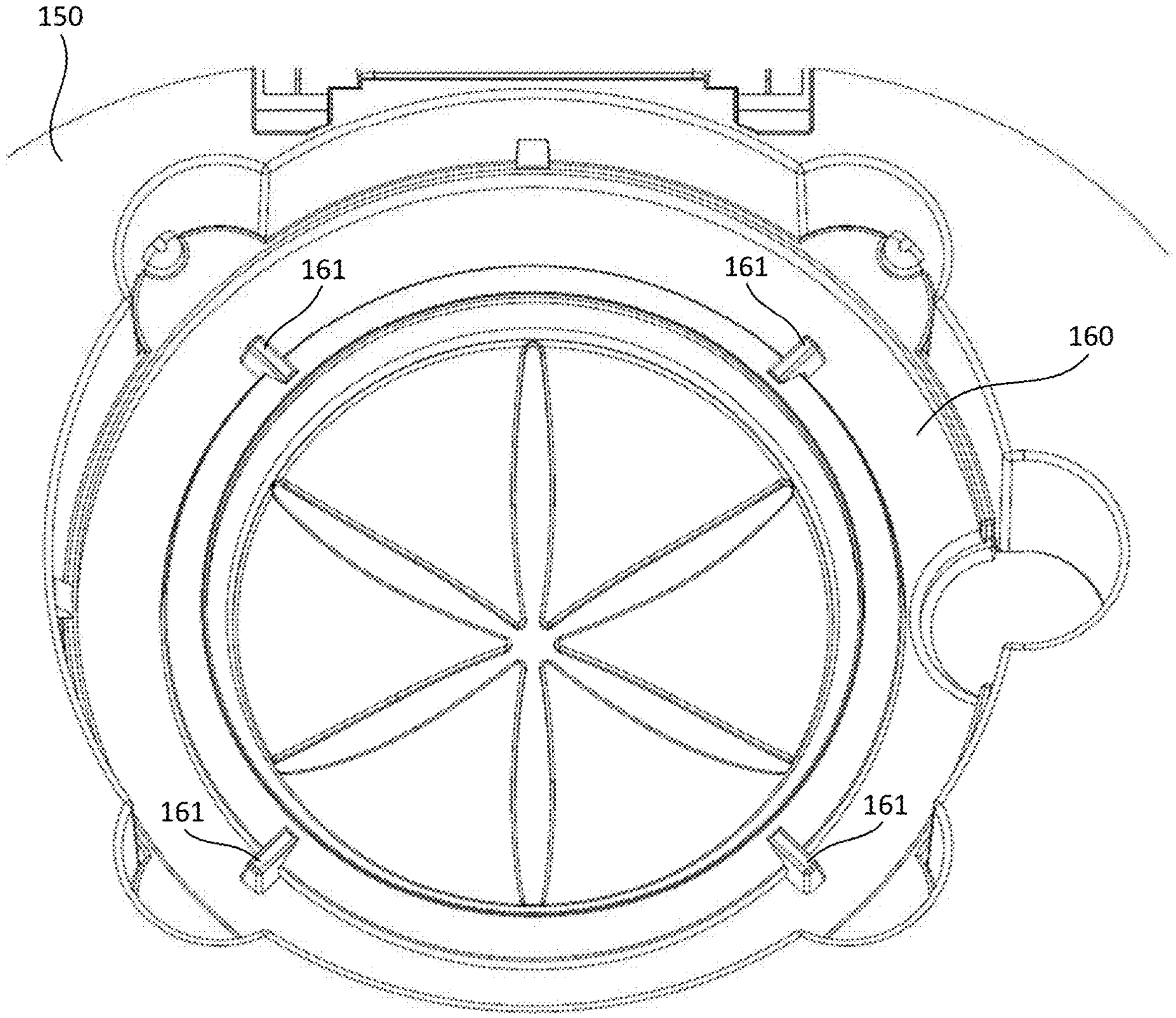
FIG. 29 is a top perspective view of the inside of a complementary waste container.

FIG. 29 shows the complementary adapter ring 160 disposed in the interior of a waste container 150. The adapter ring 160 is fitted with alignment projections 161 that mate with the plurality of apertures 34 of the cassette 10. To accommodate the design of this particular waste container 150, which has four alignment projections 161 offset at 90 degrees around a central axis 150A of the waste container 150, the complementary cassette 10 has four apertures 34. The alignment projections 161, and the corresponding apertures 34 in the cassette 10, control, or prevent, the rotation of the cassette 10.

Figure 33:
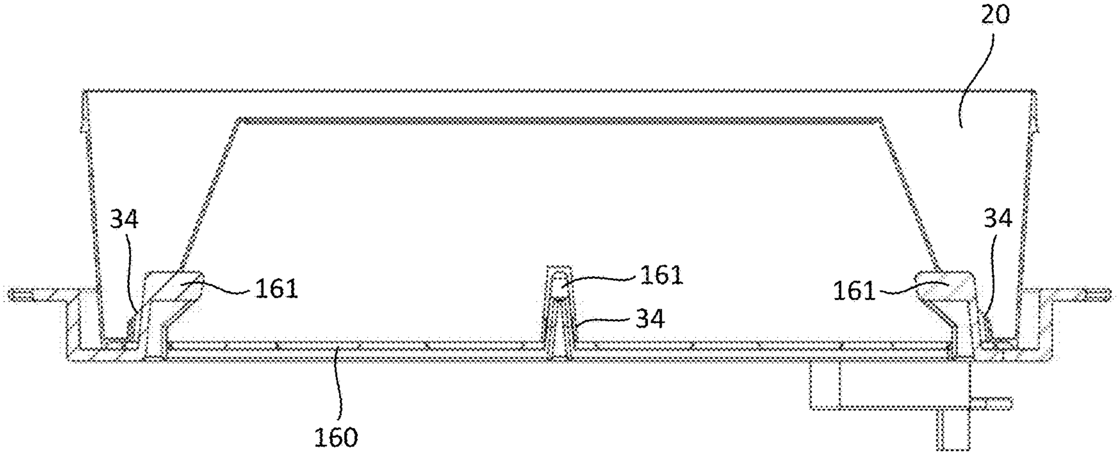
FIG. 33 is a side view of the cassette of FIG. 17 mated with the adapter ring of FIGS. 31-32.

The internal architecture of the plurality of apertures 34 in a gusset shape is optimized for the structural integrity of the cassette 10. The first aperture sidewall 135, second aperture sidewall 136 and rear aperture sidewall 138 help locate the alignment projections 161 when installing the cassette. The first and second aperture sidewalls 135, 136 provide structural support against the alignment projections 161 during rotation or when preventing rotation. The first aperture sidewall 135, the second aperture sidewall 136 and the rear aperture sidewall 138 also elevate the pleated flexible tubing 80 accumulated within the lower annular body 20 away from the outer surface of the lower annular body 20. This elevation in the walls 135, 136, 138 of the aperture 34 is beneficial in substantially reducing the interaction or interference with the alignment projections 161 that are aligned with and inserted into the apertures 34 such as shown in FIG. 33. Thus, the alignment projections 161 can easily be aligned and registered within the apertures 34. This elevated construction also helps facilitate the loading of the pleated flexible tubing 80 into the cassette 10 and the removal of the pleated flexible tubing 80 during use.

Figure 30:
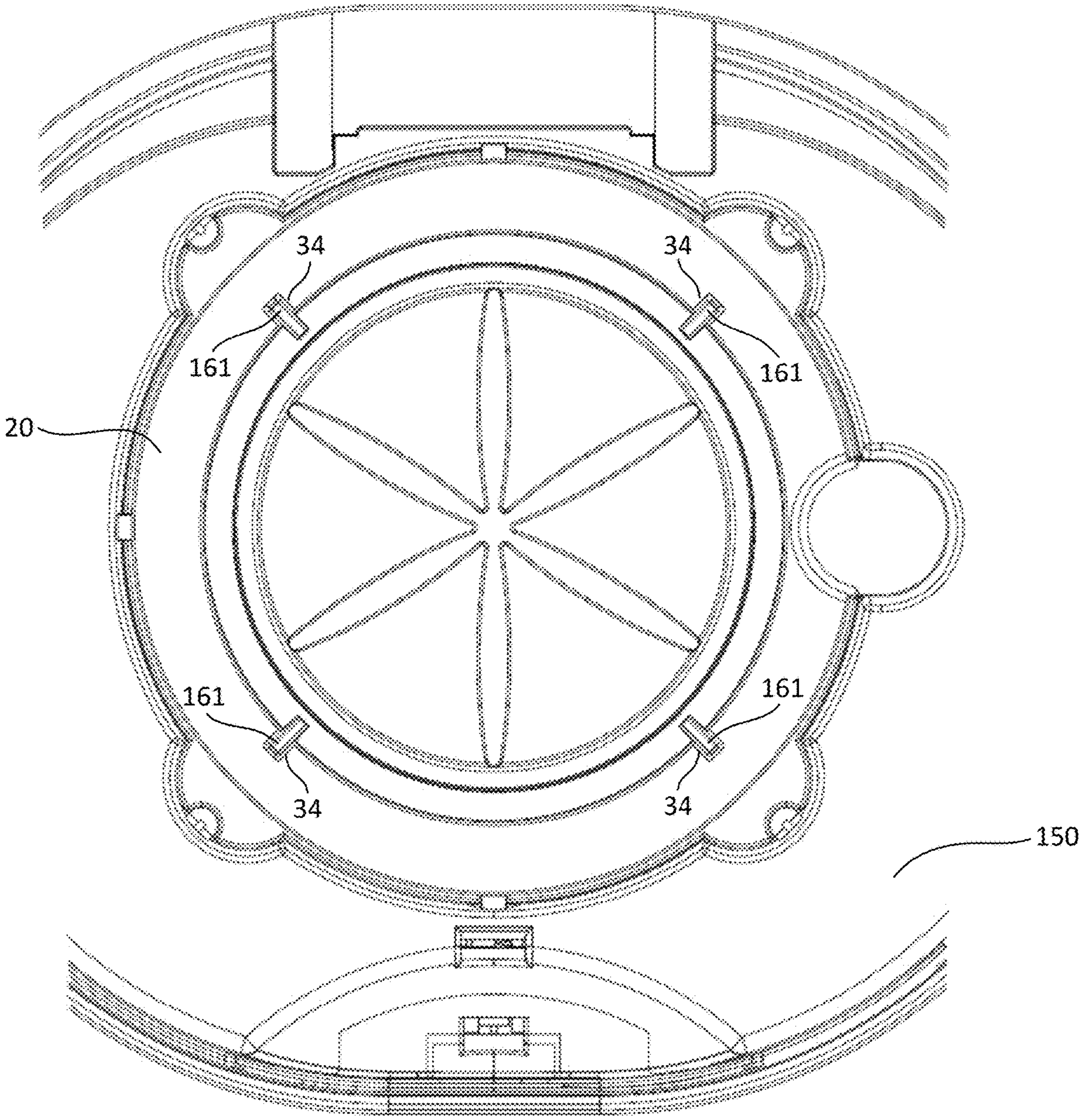
FIG. 30 is a top view of the empty cassette of FIG. 17 installed in the complementary waste container.

FIG. 30 shows the empty cassette 10 from FIG. 17 installed in the waste container 150. The alignment projections 161 mate with the plurality of apertures 34 located in the bottom of the cassette 10. Once installed, the motion of the cassette 10 is determined by the rotation, or lack thereof, of the adapter ring 160. The cassette 10 is installed flush against the adapter ring 160 with the alignment projections 161 extending through the plurality of apertures 34 of the cassette 10. As shown in FIGS. 15-35, the plurality of apertures 34 provide an open through-hole from the outside of the cassette that opens into the interior space of the annular body 20.

However, it is contemplated that the plurality of apertures 34 may not open into the interior of the lower annular body 20 and each individual aperture 34*e* may also have an upper aperture wall 139 (not shown). The upper aperture wall 139 in each of the plurality of apertures 34 would surround the top of the alignment projections 161 and prevent the alignment projections 161 from protruding into the internal cavity of the lower annular body 20 as they do with the open through-hole design shown in FIGS. 15-35.

Figure 31:
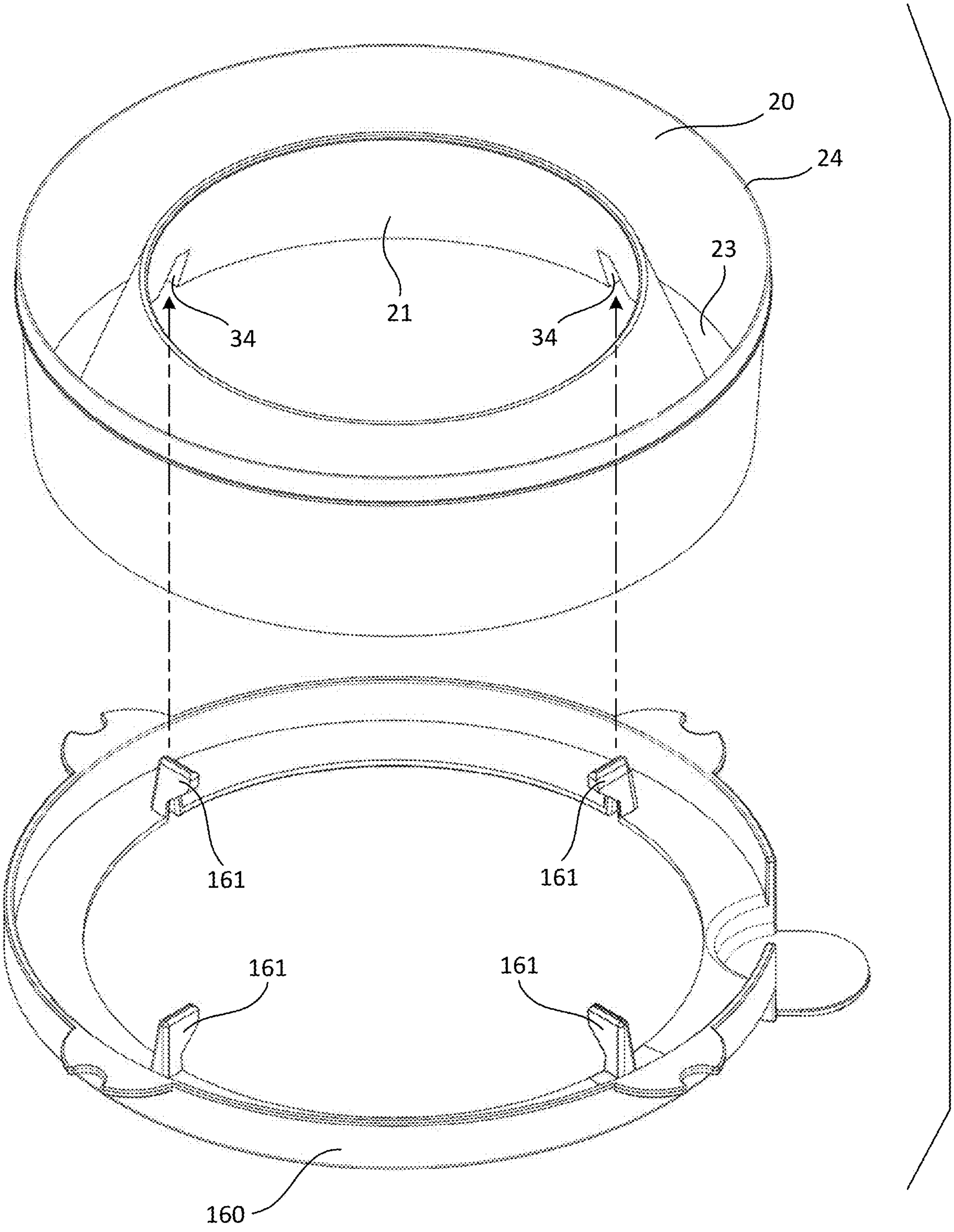
FIG. 31 is an exploded top view of the cassette of FIG. 17 and a mating adapter ring of the complementary waste container.

FIG. 31 is an exploded view of the empty lower annular body 20 from FIG. 17 and the mating adapter ring 160 of a complementary waste container 150. The alignment projections 161 are lined up with the plurality of apertures 34 disposed in the bottom of the lower annular body 20. When the cassette 10 is lowered onto the adapter ring 160 the plurality of apertures 34 may function as key holes into which a mating key or the alignment projections 161 can be used to control the positioning and/or rotation of the cassette 10 during operation of a unit (such as a waste receptacle) into which the cassette 10 may be placed and used. The alignment projection 161 may be adapted to engage any portion of the aperture 34 that can be provided on any wall 21, 23, 24 surface and cause the cassette 10 to rotate, or prevent the cassette 10 from rotating by arresting the movement of the cassette 10.

Figure 32:
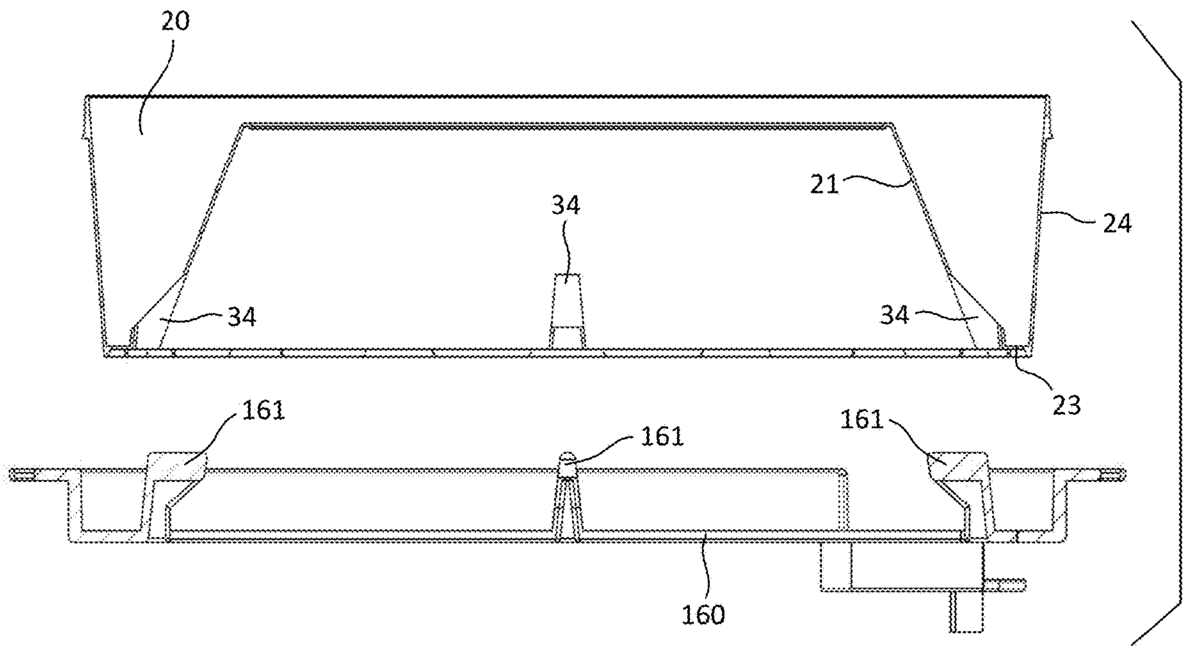
FIG. 32 is an exploded side view of the cassette of FIG. 17 and the mating adapter ring of FIG. 31.

FIG. 32 is a side cross-section view of the cassette 10 about line B-B from FIG. 19 with the adapter ring 160 in position. FIG. 33 is an exploded view of the same. FIGS. 32-33 show the alignment projections 161 mating with the plurality of apertures 34 of the cassette 34. In the embodiment shown, the alignment projections 161 of the adapter ring 160 have a hooked shape that engages with the rear aperture wall 138 of the plurality of apertures 34. However, it is contemplated that the alignment projections 161 may adapt a variety of shapes and configurations that mate with the plurality of apertures 34 such as: triangular, rectangular, circular, semicircular, vertical, and/or various three-dimensional solids formed by extension through space of these and other suitable geometric shapes.

Figure 34:
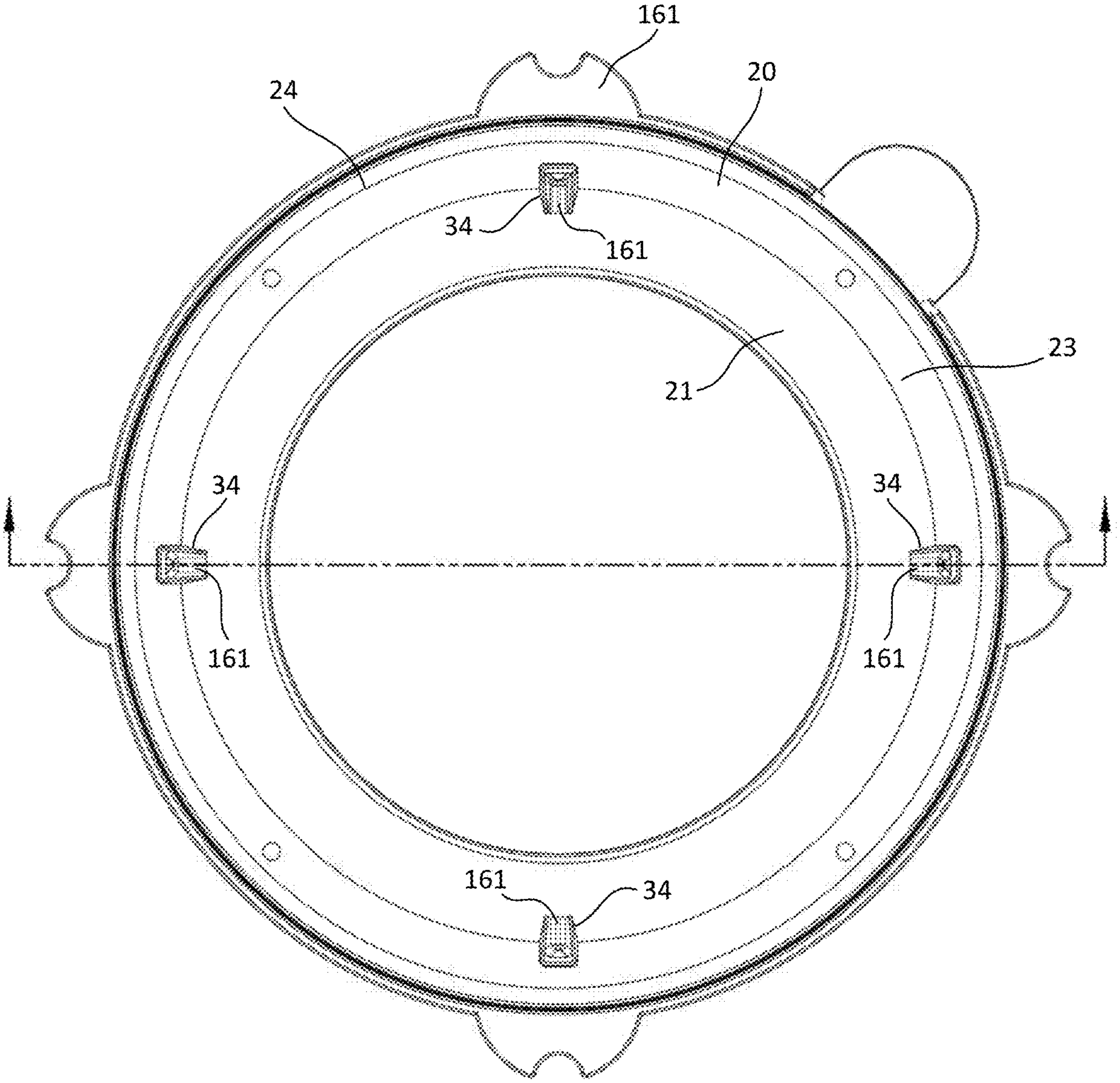
FIG. 34 is a top view of the mated cassette and adapter ring of FIG. 33.

FIG. 34 shows a top view of the cassette 10 installed on the adapter ring 160. In this embodiment, the alignment projections 161 extend into the interior of the lower annular body 20. However, the alignment projections 161 could fit within, or flush with the sidewalls 135, 136 of the plurality of apertures 34.

Figure 34A:
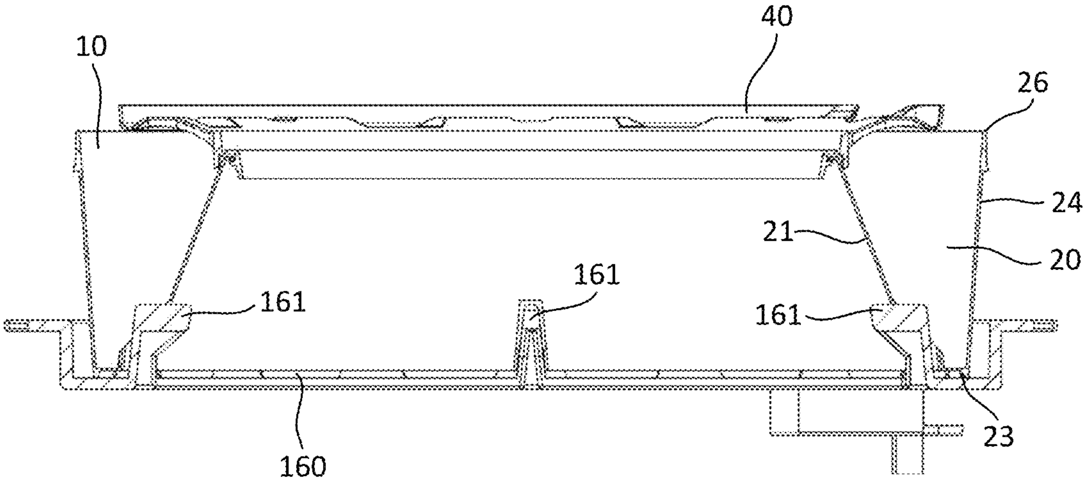
FIG. 34A is a cross section of the cassette fitted with the annular cover and mated with the adapter ring.

FIG. 34A is a cross-section of the cassette 10 fitted with the annular cover 40 and mated with the adapter ring 160. The interaction between the plurality of apertures 34 and the alignment projections 161 is shown. The alignment projections 161 extend through the plurality of apertures 34 into the internal compartment of the lower annular body 20.

Figure 34B:
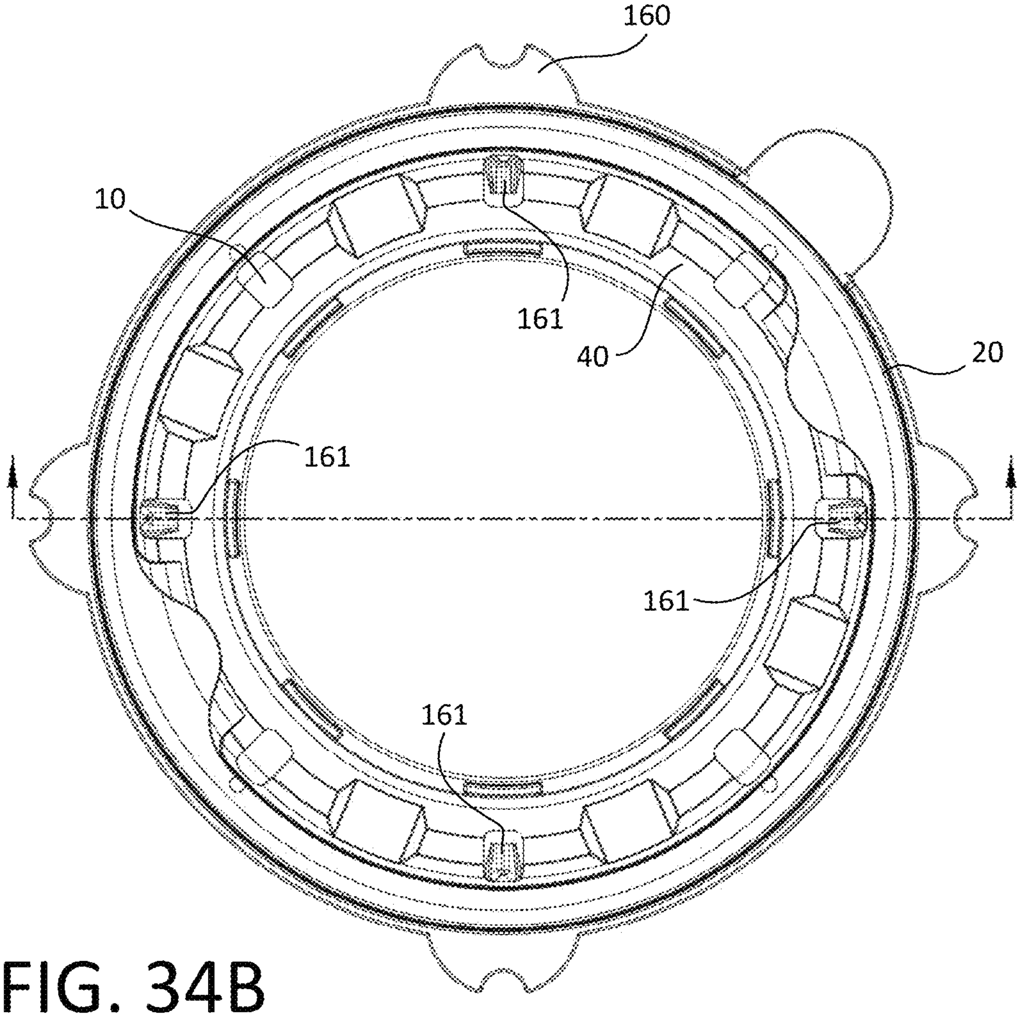
FIG. 34B is a top view of the cassette fitted with the annular cover and installed on the adapter ring.

FIG. 34B is a top view of the cassette 10 fitted with the annular cover 40 and mated with the adapter ring 160. The alignment projections 161 are shown through the empty lower annular body 20 and the apertures disposed in the annular cover 40.

Figure 35:
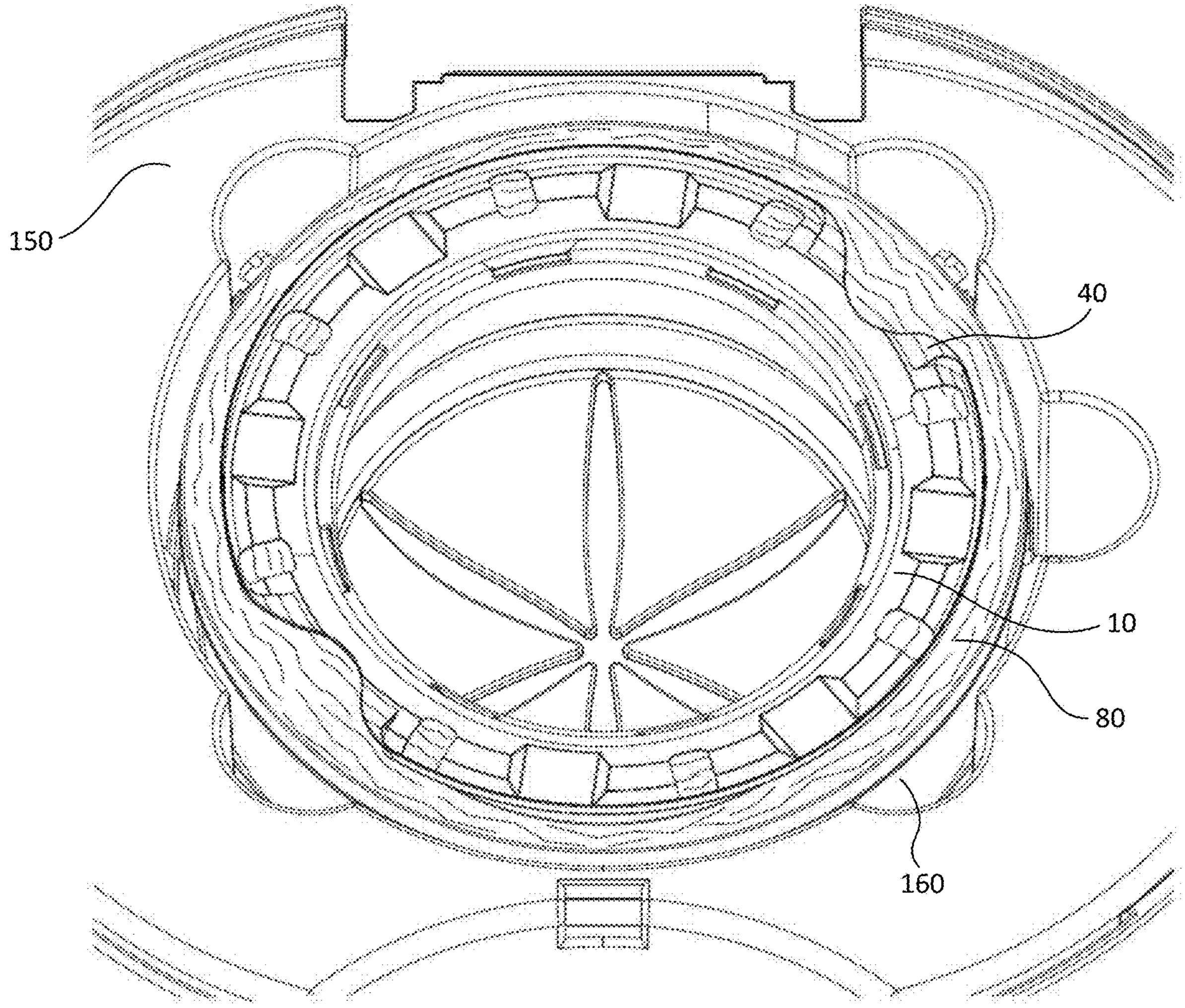
FIG. 35 is a top perspective view of a cassette with tubing and an annular cover installed in the complementary waste container.

FIG. 35 shows a cassette 10 filled with pleated flexible tubing 80 and fitted with the annular cover 40 and installed in a waste container 150.

Figure 36:
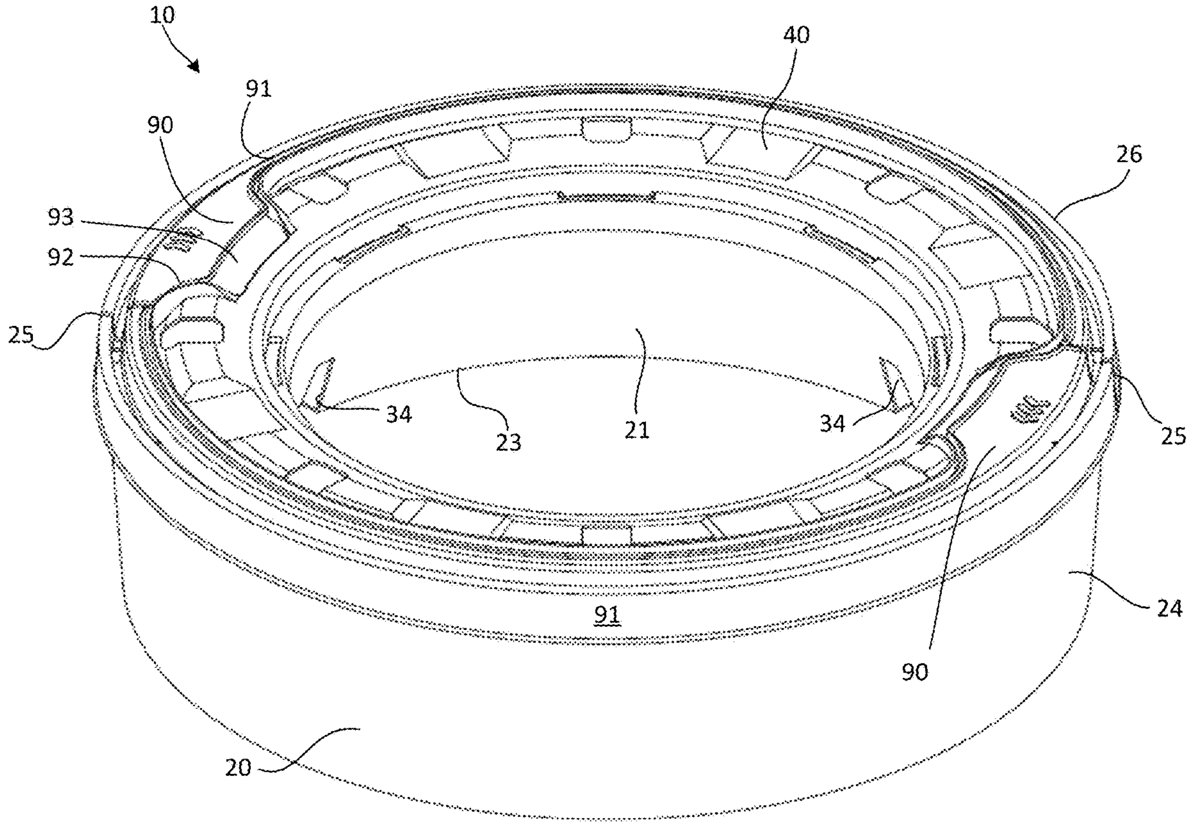
FIG. 36 depicts a top perspective view of another alternate exemplary embodiment of the cassette.

FIGS. 36-49 depict another alternate exemplary embodiment of a cassette 10 for dispensing pleated tubing. As shown in FIG. 36, cassette 10 is fitted with an annular cover 40 that attaches to the lower annular body 20. The lower annular body 20 has a lower closed channel cross-section compartment comprising an inner wall 21 connected to a bottom wall 23 (similar to that shown in FIGS. 17 and 20), which is connected to an outer wall 24. The outer wall 24 terminates at an upper end 26 thereof. The inner wall 21, bottom wall 23 and outer wall 24 collectively form the lower closed channel cross-section of a housing into which a pack 82 of a pleated flexible tubing 80 is received (shown in FIGS. 46-47, and similar to that shown in FIG. 15A). Two of a plurality of apertures 34 are shown disposed in the bottom of the lower annular body 20. In the tilted perspective view FIG. 36, the apertures 34 are shown from an outer surface view of inner wall 21.

The annular cover 40 may also have at least one pull tab 90 having an outer edge 92 and positioned directly above a tab aperture 93. The pull tabs 90 may include direction arrows to guide the user to pull up and in a specific direction to remove from the lower annular body 20. The pull tabs 90 and pull strips 91 cover the gap through which the flexible tubing 80 is drawn out when the pull tabs 90 and the pull strips 91 are removed. The use of the pull tab 90 will be described in more detail in FIGS. 48-49.

By way of example shown in FIG. 36, the construction of the tabs 90 may take on a variety of different sizes, shapes and/or configurations according to this subject disclosure. In the example shown in FIGS. 36 and 38, the tab 90 is trapezoidal with a longer side on an outer edge and a shorter side on an inner edge. But the tab 90 may also be rectangular, semi-circular, triangular or other shape as appreciated by one having ordinary skill in the art. The tabs 90 may have multiple layer construction, and be flexible enough to be readily removed by a user, as shown and described in FIGS. 48-49.

Figure 37:
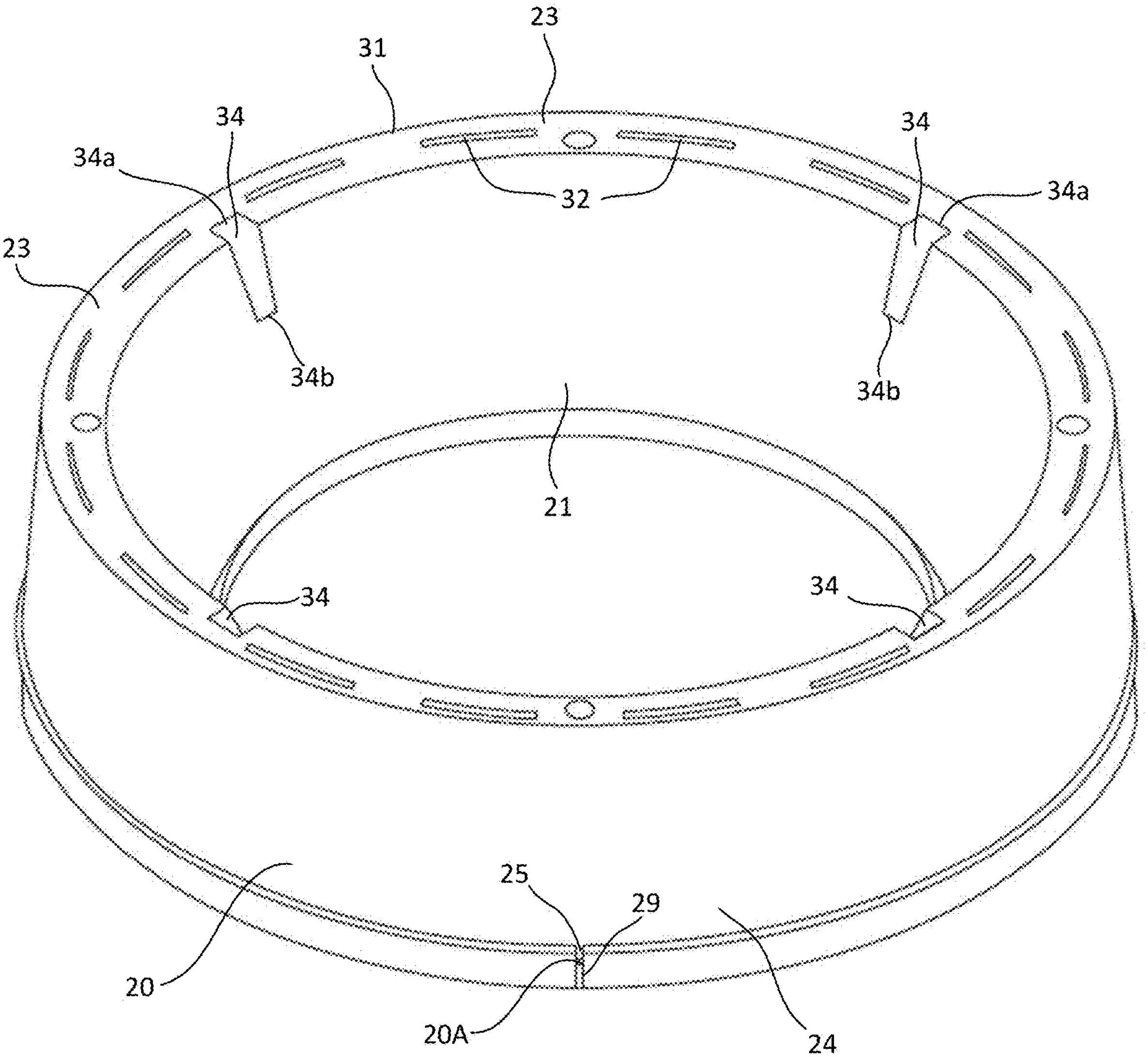
FIG. 37 illustrates a bottom perspective view of an alternate exemplary embodiment of the cassette.

FIG. 37 depicts a side perspective view of the bottom of cassette 10. The bottom wall 23 of the annular body 20 may have a bottom lip 31, a plurality of concentric downward projections 32 and a plurality of apertures 34. The bottom lip 31 may be an extension of the outer wall 24 which extends past the bottom wall 23. The bottom lip 31 may be used for stacking and storing more than one cassette 10. The concentric downward projections 32 may also be used to orient and secure more than one cassette 10 when stacking or storing the cassettes 10. The concentric downward projections 32 also add structural support to the bottom wall 23 of the cassette 10. This added structural support is especially useful when loading the pleated flexible tubing 80 into the cassette 10.

As shown in FIG. 37, each individual aperture 34 has a gusset shape which is created by cutting out a rectangular portion of the inner wall 21 and a rectangular portion of the bottom wall 23. A first end 34*a* of the aperture 34 extends into the bottom wall 23 and a second end 34*b* of the aperture 34 extends into the inner all 21. However, it is contemplated that the structure of the aperture 34 may be arranged in a variety of different positions. That is, the first end 34*a* and second end 34*b* may be located entirely in either the outer wall 24, the bottom wall 23, the inner wall 21, or any combination thereof. An advantage of the aperture 34 having a gusset shape is that alignment and positioning of the cassette 10 within the waste container 150, as well as maximizing the amount of tubing that may be stored in the lower annular body 20, is much easier to obtain as described elsewhere in this disclosure. A difference between the aperture 34 in this embodiment versus the prior embodiments is that there are no internal walls or structure to the present aperture 34, unlike those described in the prior embodiments (such as FIG. 25). In essence, the present aperture 34 shown in this embodiment is a “cut out” of the surfaces of the bottom wall 23 and inner wall 21.

Figure 38:
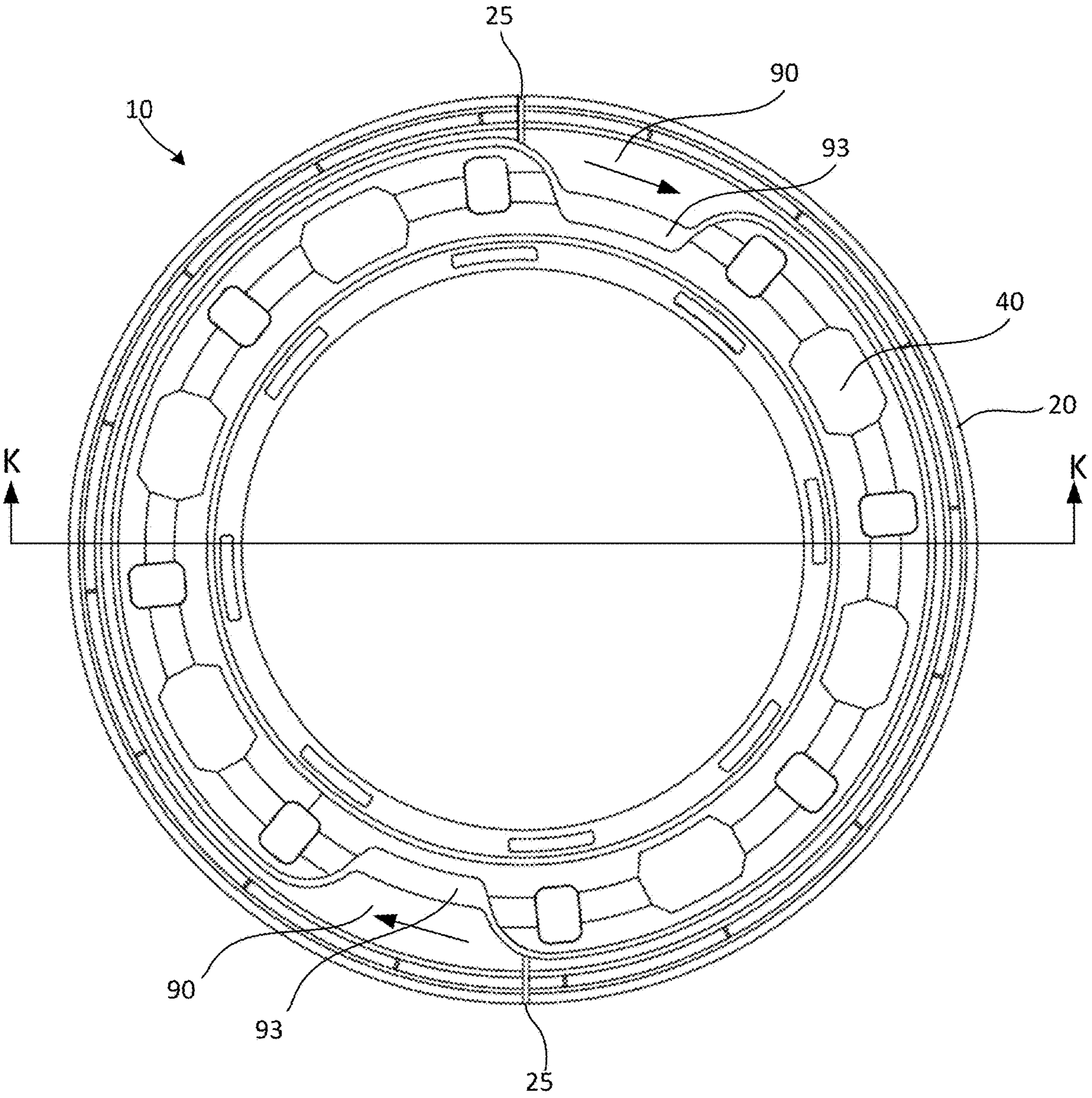
FIG. 38 illustrates a top view of the cassette fitted with the annular cover.

FIG. 38 is a top view of cassette 10 fitted with the annular cover 40. The annular cover 40 is secured to the lower annular body 20. The opposing tabs 90 and tab apertures 93 are positioned 180 degrees from each other. Rip gaps 25 at opposite ends (also shown in FIG. 36, and during use in FIGS. 48-49) provide an easy tear bond which allows the tabs 90 and attached pull strips 91 to be pulled concentrically off the top of the annular cover 40 before use, as will be described in more detail with respect to FIGS. 48-49.

Figure 39:
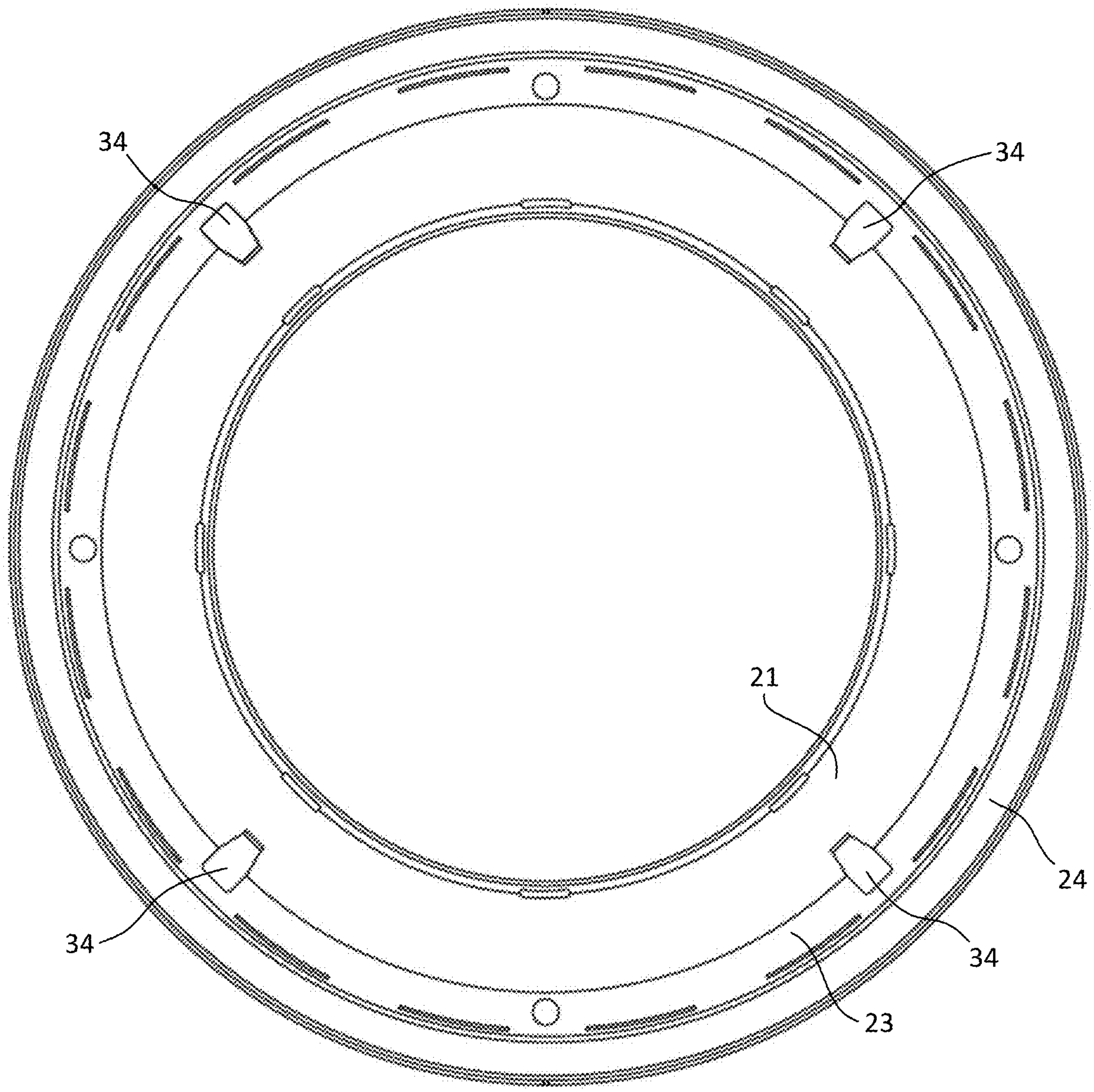
FIG. 39 illustrates a bottom view of the cassette fitted with the annular cover.

FIG. 39 is a bottom view of cassette 10. In this embodiment, there are four apertures 34 set 90 degrees from each other. However, it is contemplated that a different number of apertures 34, offset by different measures of degree may be adopted. For example, there could be three apertures 34 offset at 120 degrees, or the apertures 34 could be offset from one another in a non-symmetrical pattern. Also visible in this figure are the inner wall 21, bottom wall 23, and outer wall 24.

Figure 40:
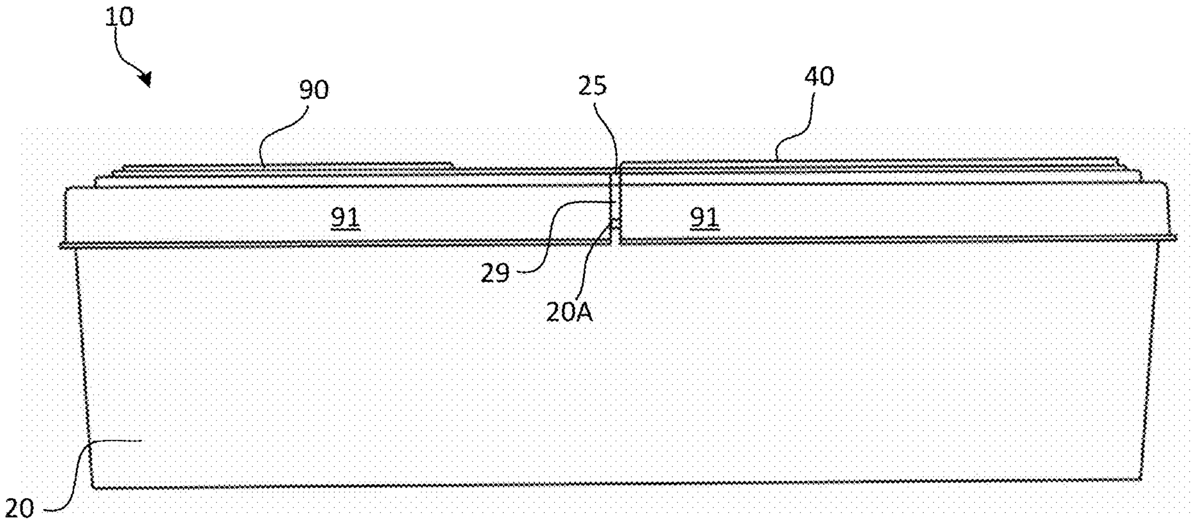
FIG. 40 illustrates a side view of the cassette fitted with the annular cover.
Figure 41:
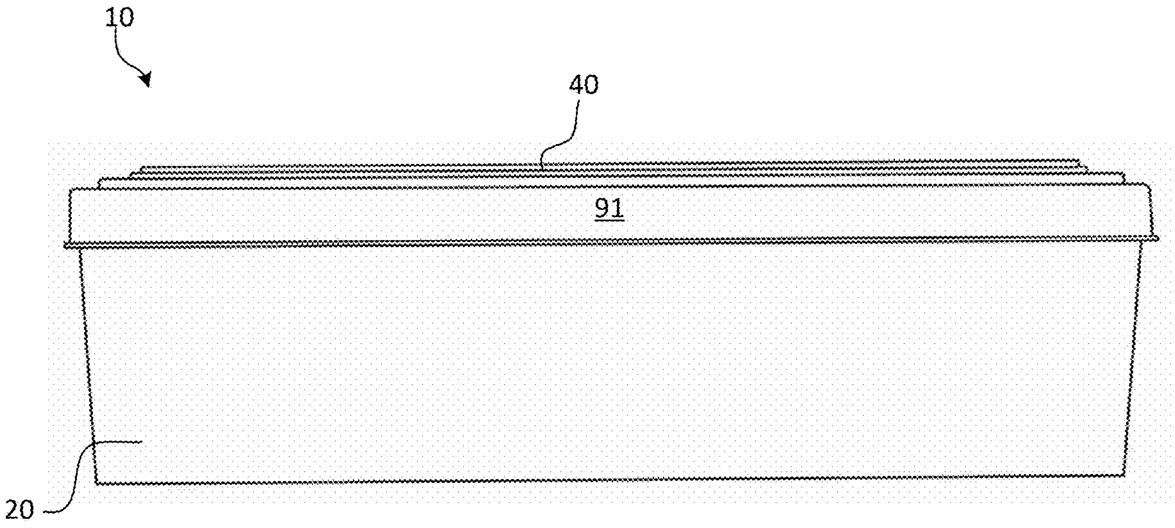
FIG. 41 illustrates another side view of the cassette fitted with the annular cover.

FIGS. 40 and 41 show top/bottom and side views, respectively, of cassette 10. Shown in the figures are the rip gap 25 with tear bridge 29 depicting an annular lip 20A therein, elevated portions of the tabs 90, pull strips 91, lower annual body 20, and annular cover 40.

Figure 42:
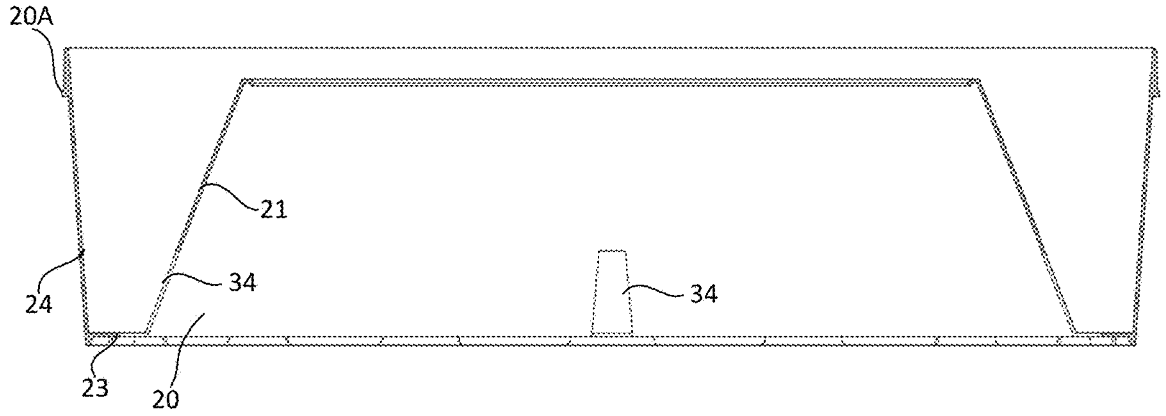
FIG. 42 illustrates a cross-sectional view of the cassette fitted without the annular cover.
Figure 43:
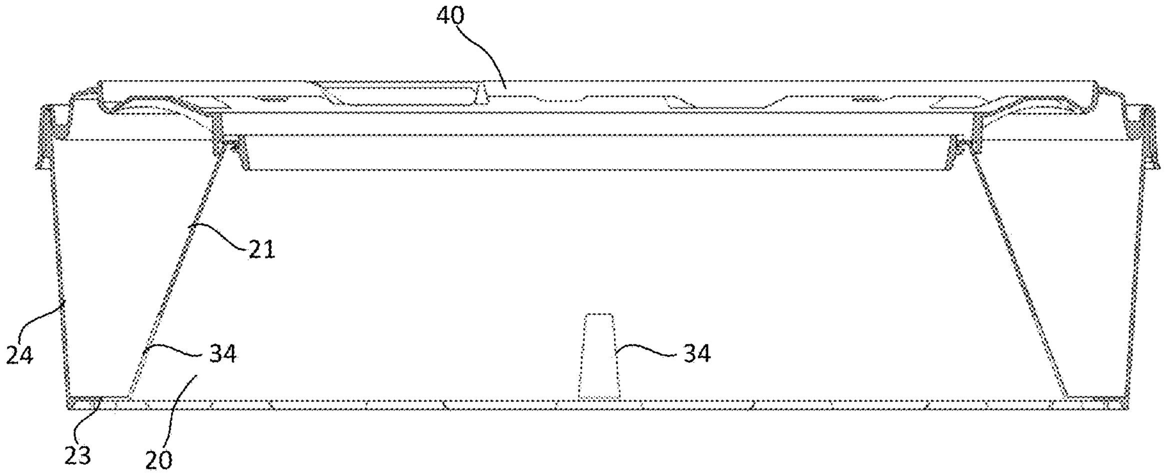
FIG. 43 illustrates a cross-sectional view of the cassette fitted with the annular cover.

FIGS. 42-43 show cross-sectional views of just a cassette 10 and cassette 10 with a cover 40, respectively, along plane K-K of FIG. 38. Although the cross-sectional area is not exact, it is illustrative of the interior of cassette 10. As compared to the cross-sectional views of other embodiments (see FIG. 13, 21, 23, etc.), the present embodiment uses less material because apertures 34 do not have internal walls (like those shown in FIG. 25) and a tear away opening including the pull tab 90 and the pull strips 91 are provided. Apertures 34 are simple cut outs of the inner wall 21 and bottom wall 23, which allow direct access between an interior portion of the cassette 10 and the channel formed between the inner wall 21, bottom wall 23, and outer wall 24. Thus, the present embodiment is easier and less costly to manufacture, and less prone to failure. Likewise, the simple cut outs allow more tubing to be packed into the lower annular body 20.

Figure 44:
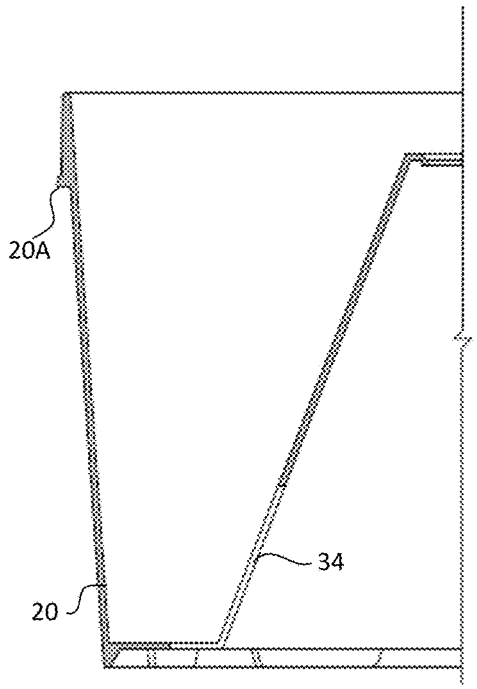
FIG. 44 illustrates a close-up cross-sectional view of the cassette fitted without the annular cover.
Figure 45:
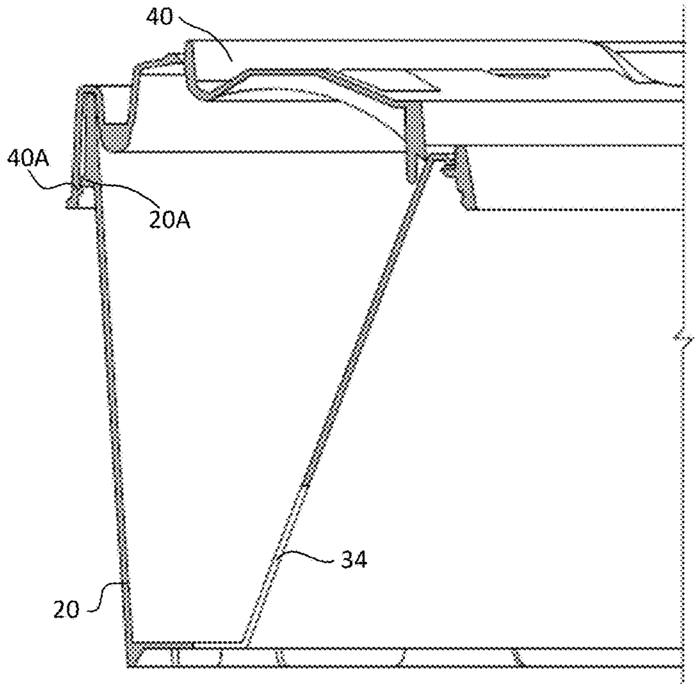
FIG. 45 illustrates a close-up cross-sectional view of the cassette fitted with the annular cover.
Figure 46:
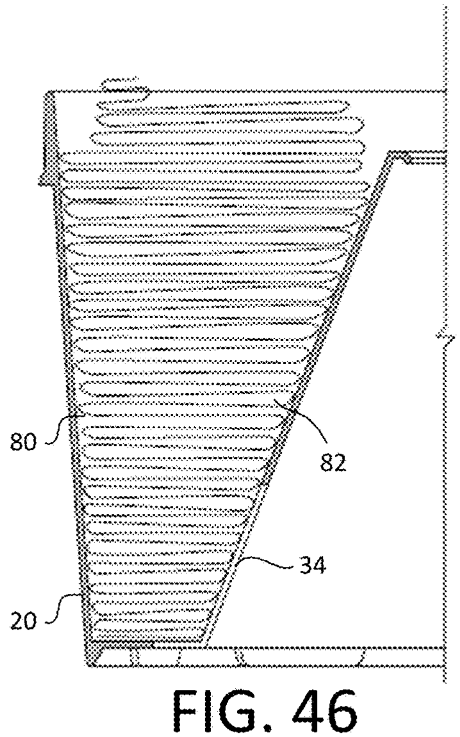
FIG. 46 illustrates a close-up cross-sectional view of the cassette fitted without the annular cover.
Figure 47:
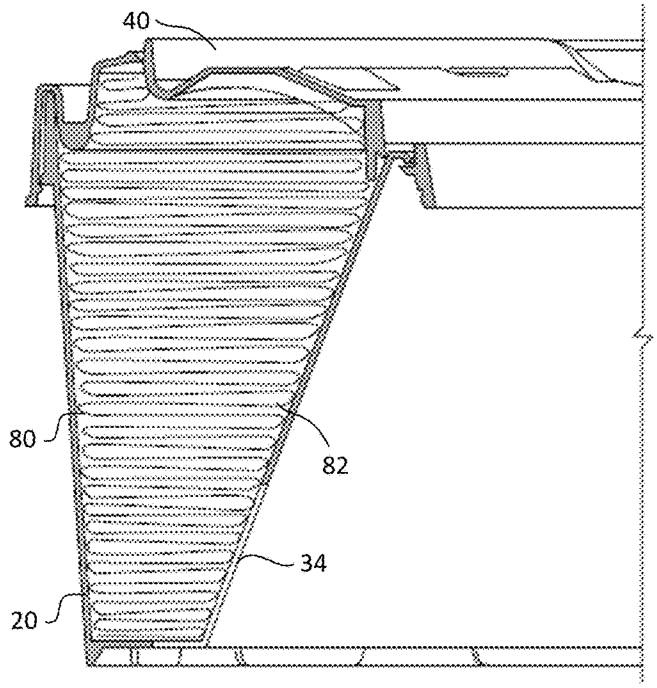
FIG. 47 illustrates a close-up cross-sectional view of the cassette fitted with the annular cover and housing a pack of tubing.

FIGS. 44-45 show close-up cross-sectional views of an end of the cassette 10 without a cover 40, and with a cover 40, respectively. FIGS. 46-47 show close-up cross-sectional views of an end of the cassette 10 without a cover 40, and with a cover 40, respectively, and housing a pack 82 of pleated flexible tubing 80. The pleated tubing 80 is secured within cassette 10 and topped off with cover 40 so that it is ready for use. As shown in FIG. 45, when the annular cover 40 is secured onto the lower annular body 20, the annular cover lip 40A protruding inward is locked onto the annular lip 20A that protrudes outward against the annular cover lip 40A. When the pull tabs 90 and the pull strips 91 are torn away from the annular cover 40, the annular cover lip 40A is torn away and disengaged from the annular lip 20A to allow its removal.

Figure 48:
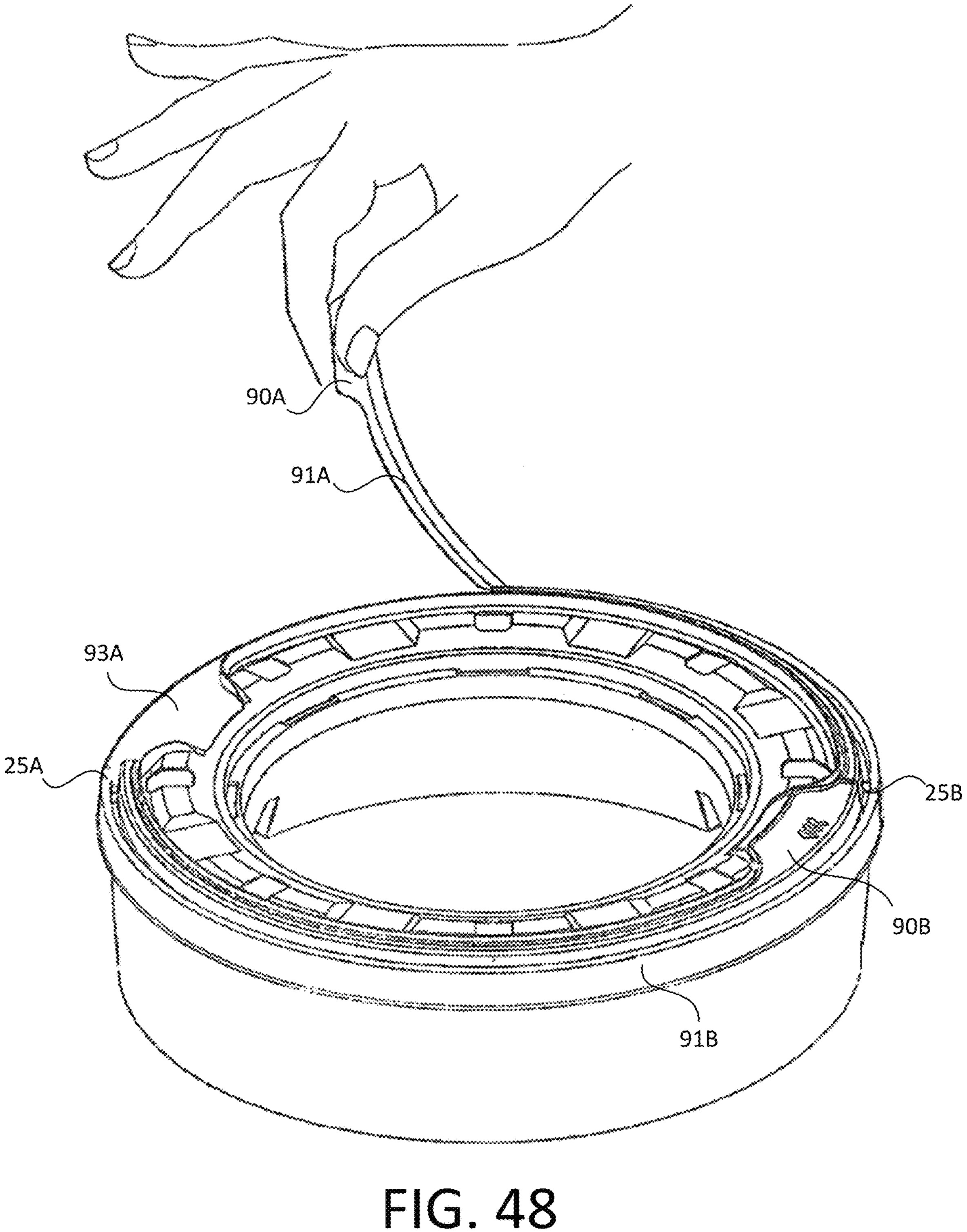
FIG. 48 illustrates use of the cassette with pull tab.
Figure 49:
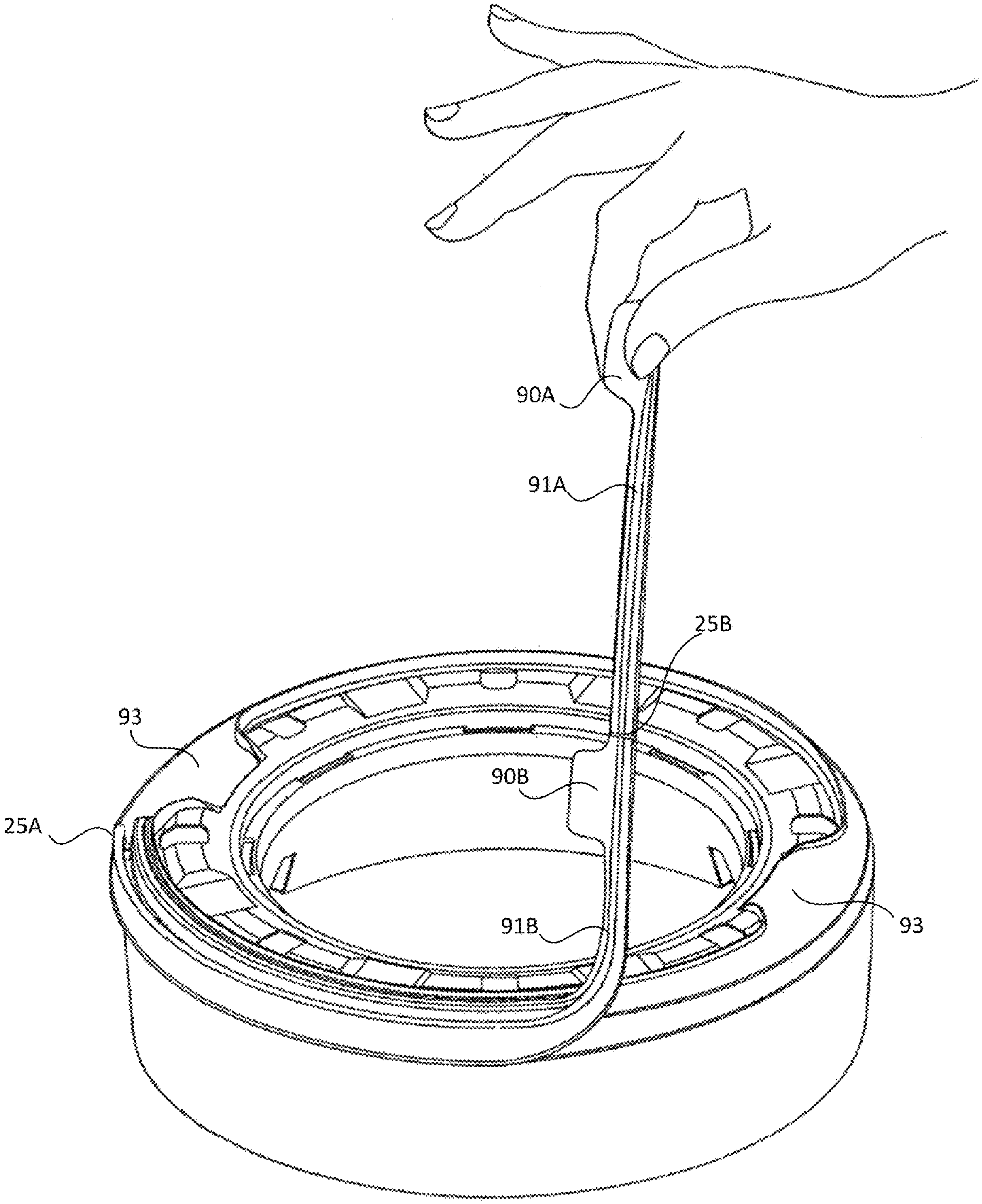
FIG. 49 illustrates use of the cassette with pull tab.

FIGS. 48-49 show the use of the pull tab 90 and the pull strips 90A being torn away from the annular cover 40. For sake of presenting a clearer description of use, in these figures, pull tabs 90 are further labeled as 90A and 90B, pull strips 91 are further labeled as 91A and 91B, and rip gaps 25 are further labeled as rip gap 25A and rip gap 25B. As shown in FIGS. 36 and 38, pull tabs 90 may have a directional marking to indicate to the user which way to pull the tab 90 up and around the top portion of cassette 10. As shown in FIGS. 36 and 48, a user would insert a finger within aperture 93, which is positioned directly underneath the tab 90, and pull upwards, or radially outward, on pull tab 90A to break the adjacent rip gap 25A. The force of pulling upwards and/or radially outward, on pull tab 90A results in the tear of bridge 29 (see FIG. 40) in rip gap 25A that connects the side of the adjacent pull strip 91 (shown as 91A and 91 B in FIGS. 48-49). As the user pulls up and clockwise on pull tab 90A, as shown in FIG. 48, the pull strip 91A separates from the annular top 40 until pull strip 91A reaches the second rip gap 25B. The user continues the upward and clockwise pull up on the pull tab 90A, as shown in FIG. 49, so that the second pull tab 90B is also pulled up with the pull strip 91A attached to the first pull tab 90A in the user's finger. The user continues to pull up on pull tab 90A until both pull tabs 90A/90B and both pull strips 91A/91B are separated from the annular top 40. The user then has access to the flexible tubing 80 to pull out and engage into use, as described above. The second rip gap 25B is sufficiently strong enough not to tear as the pull tab 90A is being pulled upward through the second pull tab 90B. However, in case the first pull tab 90A and first pull strip 91A get detached from the second pull tab 90B, then the user can pull up on pull tab 90B and continue the upward and clockwise pull motion to separate pull tab 90B and pull strip 91B from the annular top 40. Thus, there is a pull tab and pull strip system to open up the gap for the flexible tubing 80 to be accessed and used.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A cassette to dispense a pleated tubing, comprising:

a body having a channel housing formed by an outer wall, an inner wall, and a bottom wall;

a cover attached to the body that defines a gap over the body;

a pull tab attached to a pull strip and positioned atop the gap;

a tubing disposed within the channel housing and withdrawn from the gap; and a plurality of apertures, of which at least one aperture having a gusset shape no internal walls projecting into the channel housing and extending from a first end at the bottom wall to a second end at the inner wall of the body adapted to align with and receive a projection extending upward.

2. The cassette to dispense a pleated tubing recited in claim 1, wherein the at least one aperture provides an opening through the lower end of the body.

3. The cassette to dispense a pleated tubing recited in claim 1, further comprising a plurality of pulls tabs and pull strips positioned in series and separated by a plurality of rip gaps and tear bridges.

4. The cassette to dispense a pleated tubing recited in claim 1, wherein the tubing is elevated to allow a mating projection to be inserted into the at least one aperture without substantial interference from the tubing.

5. The cassette to dispense a pleated tubing recited in claim 1, wherein the at least one aperture is disposed concentrically about the body and extends from at least one of the outer wall, the bottom wall or the inner wall.

6. The cassette to dispense a pleated tubing recited in claim 1, wherein the at least one aperture is adapted to mate with a keying mechanism disposed within a container to control the angular rotation of the cassette.

7. The cassette to dispense a pleated tubing recited in claim 1, wherein the at least one aperture is adapted to align with and receive the projection extending upward from a container.

8. The cassette to dispense a pleated tubing recited in claim 1, wherein the at least one aperture is adapted to align and receive a projection extending upward from an adapter ring disposed within a container.

9. The cassette to dispense a pleated tubing recited in claim 1, wherein a lip extends downwards from the outer wall past a point of intersection with the bottom wall, and wherein at least one concentric downward projection is disposed on the bottom wall.

10. A cassette to dispense a pleated tubing, comprising:
a body having a channel housing formed by an outer wall, an inner wall, and a bottom wall;
a cover defining a gap over the body;
a tubing disposed within the channel housing and withdrawn from the gap;
a plurality of pull tabs attached to a plurality of pull strips and positioned in series atop the gap; and
a plurality of apertures, of which at least one aperture with a gusset shape is having no internal walls projecting into the channel housing, and disposed in a lower end of the body, and extending from a first end at the bottom wall to a second end at the inner wall of the body;
wherein the at least one aperture provides an opening through a lower end of the body adapted to receive an alignment projection extending upward.

11. The cassette to dispense a pleated tubing recited in claim 10, wherein the at least one aperture is adapted to receive more than one alignment projections to control the rotation of the cassette.

12. The cassette to dispense a pleated tubing recited in claim 10, wherein the alignment projection extends upward from a waste container.

13. A cassette to dispense a pleated tubing, comprising:
a body having a channel housing;
a cover attached to the body that defines a gap over the body;
a tubing disposed within the channel housing and withdrawn from the gap; and
a plurality of pull tabs attached to a plurality of pull strips and positioned in series atop the gap and separated by a plurality of rip gaps and tear bridges; and
a plurality of apertures, of which at least one aperture having a gusset shape with no internal walls projecting into the channel housing, and disposed in a lower end of the body and adapted to receive a mating projection extending upward.

14. The cassette to dispense a pleated tubing recited in claim 13, wherein the at least one aperture provides an opening through the lower end of the body.

15. The cassette to dispense a pleated tubing recited in claim 13, wherein the at least one aperture extends from a first end at a bottom wall to a second end at an inner wall of the body.

16. The cassette to dispense a pleated tubing recited in claim 13, wherein the pleated tubing is elevated to allow the mating projection to be inserted into the at least one aperture without substantial interference from the pleated tubing.

17. The cassette to dispense a pleated tubing recited in claim 13, wherein the at least one aperture is disposed concentrically about the body and extends from at least one of an outer wall, a bottom wall or an inner wall.

18. The cassette to dispense a pleated tubing recited in claim 13, wherein the mating projection is a keying mechanism disposed within a container to control the angular rotation of the cassette.

19. The cassette to dispense a pleated tubing recited in claim 13, wherein the at least one aperture is adapted to align with and receive the mating projection extending upward from a container.

20. The cassette to dispense a pleated tubing recited in claim 13, wherein the at least one aperture is adapted to align and receive the mating projection extending upward from an adapter ring disposed within a container.

* * * * *